United States Patent
Ramjee et al.

(10) Patent No.: US 10,356,719 B2
(45) Date of Patent: Jul. 16, 2019

(54) SKIP-CORRELATION BASED SYMMETRIC CARRIER SENSING WITH MULTIPLE POWER LEVELS

(71) Applicant: Microsoft Technology Licensing, LLC, Redmond, WA (US)

(72) Inventors: Ramachandran Ramjee, Bangalore (IN); Krishna Kant Chintalapudi, Bellevue, WA (US); Romil Bhardwaj, New Delhi (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 194 days.

(21) Appl. No.: 15/192,948

(22) Filed: Jun. 24, 2016

(65) Prior Publication Data
US 2017/0374618 A1    Dec. 28, 2017

(51) Int. Cl.
*H04W 74/08*    (2009.01)
*H04W 52/02*    (2009.01)
(Continued)

(52) U.S. Cl.
CPC ...... *H04W 52/0219* (2013.01); *H04B 17/309* (2015.01); *H04W 8/22* (2013.01);
(Continued)

(58) Field of Classification Search
CPC ..... H04W 84/12; H04W 88/08; H04W 16/14; H04W 52/0219; H04W 52/36;
(Continued)

(56) References Cited

U.S. PATENT DOCUMENTS 7,313,085 B2    12/2007    Kim
7,570,627 B2    8/2009    Welborn et al.
(Continued)

OTHER PUBLICATIONS

Radunovic, et al., "Adaptive Preambles for Coexistence", In Technical Report of MSR-TR-2011-15, Jun. 2011, 15 pages.
(Continued)

*Primary Examiner* — Asad M Nawaz
*Assistant Examiner* — Zhaohui Yang
(74) *Attorney, Agent, or Firm* — Alleman Hall Creasman & Tuttle LLP

(57) ABSTRACT

A "Skip-Correlator" ensures carrier sensing symmetry between wireless devices of arbitrary transmission power levels, thereby enabling fair sharing of available spectrum of a wireless channel between the wireless devices. In various implementations, receivers of a wireless device receive wireless preambles from neighboring wireless transmitters. This preamble includes an indication of a transmission power level of the neighboring wireless transmitter. The wireless device then selects and correlates a subset of samples of the received preamble as a function of a transmission power level of that wireless device. The remaining samples of the preamble are skipped by the receiving wireless device, hence the use of the term "Skip-Correlator." Further, the wireless device computes a total preamble energy of the correlated samples of the received preamble. Finally, the wireless device implements carrier sensing symmetry between itself and the neighboring wireless transmitter as a function of the total preamble energy.

20 Claims, 11 Drawing Sheets

Exemplary Carrier-Sensing Symmetry Implementation for Multiple Devices having Arbitrary Transmit Power Levels

(51) Int. Cl.
  *H04W 8/22* (2009.01)
  *H04W 52/54* (2009.01)
  *H04W 52/36* (2009.01)
  *H04B 17/309* (2015.01)
  *H04W 84/12* (2009.01)
  *H04B 17/382* (2015.01)

(52) U.S. Cl.
  CPC ........... *H04W 52/36* (2013.01); *H04W 52/54* (2013.01); *H04W 74/0816* (2013.01); *H04B 17/382* (2015.01); *H04W 74/0808* (2013.01); *H04W 84/12* (2013.01); *Y02D 70/10* (2018.01); *Y02D 70/14* (2018.01); *Y02D 70/142* (2018.01); *Y02D 70/144* (2018.01); *Y02D 70/162* (2018.01); *Y02D 70/26* (2018.01)

(58) Field of Classification Search
  CPC ............. H04W 52/54; H04W 74/0808; H04W 74/0816; H04W 8/22; H04B 17/309; H04B 17/382; Y02D 70/10; Y02D 70/14; Y02D 70/142; Y02D 70/144; Y02D 70/162; Y02D 70/26
  See application file for complete search history.

(56) References Cited

U.S. PATENT DOCUMENTS

| | | | |
|---|---|---|---|
| 7,664,465 | B2 | 2/2010 | Shen et al. |
| 8,379,539 | B2 | 2/2013 | Bange et al. |
| 8,611,457 | B2 | 12/2013 | Gardner et al. |
| 8,694,030 | B2 | 4/2014 | Campbell et al. |
| 9,113,371 | B2 | 8/2015 | Sun et al. |
| 2007/0079376 | A1* | 4/2007 | Robert ................ H04L 63/1408 726/23 |
| 2008/0139233 | A1 | 6/2008 | Wang |
| 2011/0255557 | A1 | 10/2011 | Varadarajan et al. |
| 2012/0243522 | A1 | 9/2012 | Morioka et al. |
| 2012/0294232 | A1 | 11/2012 | Radunovic et al. |
| 2012/0294233 | A1 | 11/2012 | Radunovic et al. |
| 2013/0142185 | A1 | 6/2013 | Leizerovich et al. |
| 2014/0056394 | A1* | 2/2014 | Takahashi ................ H04L 1/201 375/343 |
| 2014/0269524 | A1 | 9/2014 | Xiao et al. |
| 2015/0131641 | A1 | 5/2015 | Ong et al. |
| 2016/0073430 | A1* | 3/2016 | Azizi ................ H04W 74/0825 370/329 |
| 2016/0121127 | A1* | 5/2016 | Klimovitch ......... H04W 52/245 607/32 |
| 2017/0171888 | A1* | 6/2017 | Itagaki .............. H04W 74/0816 |
| 2017/0202016 | A1* | 7/2017 | Itagaki .................. H04W 74/08 |
| 2018/0199380 | A1* | 7/2018 | Itagaki .................... H04M 1/74 |

OTHER PUBLICATIONS

Navda, Vishnu, "Cross-layer design for interference mitigation and mobility support in wireless access networks", In Dissertation of Stony Brook University, Dec. 2007, 1 page.

Buettner, et al., "X-MAC: A Short Preamble MAC Protocol for Duty-Cycled Wireless Sensor Networks", In Proceedings of the 4th international conference on Embedded networked sensor systems, Nov. 1, 2006, pp. 307-320.

Merz, et al., "Performance Evaluation of Impulse Radio UWB Networks using Common or Private Acquisition Preambles", In Journal of IEEE Transactions on Mobile Computing archive vol. 8, Issue 7, Jul. 2009, pp. 1-14.

"Cisco Aironet 1570 Series Outdoor Access Point", Retrieved on: Apr. 5, 2016 Available at: http://www.cisco.com/c/dam/en/us/products/collateral/wireless/aironet-1570-series/datasheet-c78-732348.pdf.

"AirPort Express", Retrieved on: Apr. 5, 2016 Available at: http://www.apple.com/airport-express/specs/.

"WARPLab: Automatic Gain Control", Retrieved on: Apr. 5, 2016 Available at: https://warpproject.org/trac/wiki/WARPLab/AGC.

"Cisco Aironet 1830 Series Access Points", Retrieved on: Apr. 5, 2016 Available at: http://www.cisco.com/c/en/us/products/collateral/wireless/aironet-1830-series-access-points/datasheet-c78-735582.html.

Dondurmacioglu, Ozer, "RF Basics—Part 1", Feb. 3, 2012 Available at: http://community.arubanetworks.com/aruba/attachments/aruba/tkb%40tkb/121/1/RF-Basics_Part1.pdf.

"HPE 560 802.11ac Dual Radio Access Point Series", Retrieved on: Apr. 5, 2016 Available at: http://www8.hp.com/h20195/v2/GetPDF.aspx/4AA5-1459ENW.pdf.

"802.11ac-2013—IEEE Standard for Information technology—Telecommunications and information exchange between systemsLocal and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz", Published on: Dec. 18, 2013, Available at: http://ieeexplore.ieee.org/xpl/articleDetails.jsp?arnumber=6687187&filter=AND(p_Publication_Number:6687185).

"LTE Aggregation and Unlicensed Spectrum", In White paper of 4G Americas, Nov. 2015, 27 pages.

"The Global Public Wi-Fi Network Grows to 50 Million Worldwide Wi-Fi Hotspots", Published on: Jan. 20, 2015 Available at: http://www.marketwired.com/press-release/the-globalpublic-wi-fi-network-grows-to-50-million-worldwidewi-fi-hotspots-nasdaq-ipas-1984287.htm.

Akella, et al., "Self-management in chaotic wireless deployments", In Journal of Wireless Networks, vol. 13, Issue 6, Dec. 2007, pp. 737-755.

Brodsky, et al., "In defense of wireless carrier sense", In Proceedings of the ACM SIGCOMM conference on Data communication, Aug. 17, 2009, pp. 147-158.

Fuemmeler, et al., "Selecting Transmit Powers and Carrier Sense Thresholds for CSMA Protocols", In Technical Report of University of Illinois at Urbana-Champaign, Oct. 2004, pp. 1-18.

Hua, et al., "Starvation Modeling and Identification in Dense 802.11 Wireless Community Networks", In Proceedings of IEEE the 27th Conference on Computer Communications, Apr. 13, 2008, 1696-1704.

Jamieson, et al., "Understanding the Real-World Performance of Carrier Sense", In Proceedings of the ACM SIGCOMM workshop on Experimental approaches to wireless network design and analysis, Aug. 22, 2005, pp. 52-57.

Comments of Google Inc., ET Dkt. 15-105, Jun. 11, 2015, with attached white paper by Jindal, et al., "LTE and Wi-Fi in Unlicensed Spectrum: A Coexistence Study", Jun. 11, 2015, pp. 1-36. Available at: http://apps.fcc.gov/ecfs/document/view?id=60001078145.

Kim, et al., "Improving Spatial Reuse through Tuning Transmit Power, Carrier Sense Threshold, and Data Rate in Multihop Wireless Networks", In Proceedings of 12th Annual International Conference on Mobile Computing and Networking, Sep. 23, 2006, pp. 366-377.

Kleinrock, et al., "Packet Switching in Radio Channels: Part I—Carrier Sense Multiple-Access Modes and Their Throughput-Delay Characteristics", In Journal of IEEE Transactions on Communications, vol. 23, Issue 12, Dec. 1975, pp. 1400-1416.

Liu, et al., "Interference-Aware Transmission Power Control for Dense Wireless Networks", In Proceedings of Annual Conference of ITA, Sep. 25, 2007, 7 pages.

Magsiretti, et al., "WiFi-Nano: Reclaiming WiFi Efficiency through 800 ns slots", In Proceedings of 17th Annual International Conference on Mobile Computing and Networking, Sep. 19, 2011, 12 pages.

Mhatre, et al., "Interference Mitigation Through Power Control in High Density 802.11 WLANs", In Proceedings of 26th IEEE International Conference on Computer Communications, May 6, 2007, pp. 535-543.

Radunovic, et al., "Weeble: Enabling Low-Power Nodes to Coexist with High-Power Nodes in White Space Networks", In Proceedings of 8th International Conference on Emerging Networking Experiments and Technologies, Dec. 10, 2012, pp. 205-216.

(56) References Cited

OTHER PUBLICATIONS

Richart, et al., "Self management of rate, power and carrier-sense threshold for interference mitigation in IEEE 802.11 networks", In Proceedings of 10th International Conference on Network and Service Management, Nov. 17, 2014, pp. 264-267.

Schmidl, et al., "Robust Frequency and Timing Synchronization for OFDM", In Journal of IEEE Transactions on Communications, vol. 45, No. 12, Dec. 1997, pp. 1613-1621.

Sur, et al., "Bridging Link Power Asymmetry in Mobile Whitespace Networks", In Proceedings of IEEE Conference on Computer Communications, Apr. 26, 2015, 9 pages.

Tufvesson, et al., "Time and frequency synchronization for OFDM using PN-sequence preambles", In Proceedings of IEEE VTS 50th Vehicular Technology Conference, Sep. 19, 1999, pp. 2203-2207.

Vasan, et al., "ECHOS—Enhanced Capacity 802.11 Hotspots", In Proceedings of IEEE 24th Annual Joint Conference of the IEEE Computer and Communications Societies, vol. 3, Mar. 13, 2005, 11 pages.

Yang, et al., "Modeling the Effect of Transmit Power and Physical Carrier Sense in Multi-hop Wireless Networks", In Proceedings of 26th IEEE International Conference on Computer Communications, May 6, 2007, pp. 2331-2335.

Zhu, et al., "CSMA Self-Adaptation Based on Interference Differentiation", In Proceedings of Global Telecommunications Conference, Nov. 26, 2007, pp. 4946-4951.

Zhu, et al., "Leveraging Spatial Reuse in 802.11 Mesh Networks with Enhanced Physical Carrier Sensing", In Proceedings of IEEE International Conference on Communications, vol. 7, Jun. 20, 2004, pp. 4004-4011.

Weiss, et al., "Synchronization Algorithms and Preamble Concepts for Spectrum Pooling Systems", In IST Mobile & Wireless Telecommunications Summit, Jun. 2003, pp. 788-792.

Bhardwaj, et al., "Skip-Correlation for Multi-Power Wireless Carrier Sensing Skip-Correlation for Multi-Power Wireless Carrier Sensing", In Proceedings of the 14th USENIX Symposium on Networked Systems Design and Implementation, Mar. 27, 2017, 17 Pages.

"International Search Report and Written Opinion Issued in PCT Application No. PCT/US2017/038215", dated Sep. 1, 2017, 13 Pages.

\* cited by examiner

SKIP-CORRELATION BASED SYMMETRIC CARRIER SENSING WITH MULTIPLE POWER LEVELS

BACKGROUND

"Carrier Sensing" enables decentralized sharing of spectrum between wireless transmission devices. For example, existing carrier sensing mechanisms, based on the current IEEE 802.11 Wi-Fi standard specification, attempt to avoid transmission collisions between Wi-Fi devices by causing such devices to determine whether a particular transmission channel is free prior to transmitting on that channel. The current IEEE 802.11 Wi-Fi standard defines a channel as being free for transmission by a particular Wi-Fi device if that device senses the localambient power of transmissions on that channel to be less than a fixed carrier sensing threshold. The current IEEE 802.11 Wi-Fi standard defines this carrier sensing threshold as −82 dBm. Consequently, if a particular Wi-Fi device does not sense ambient transmission power of other Wi-Fi devices at or above the carrier sensing threshold, then that particular device assumes that the channel is free for transmission, regardless of whether any other local Wi-Fi devices are actually transmitting on that channel.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

A "Skip-Correlator," as described herein, provides various techniques that ensure carrier sensing symmetry between wireless communications devices (also referred to herein as "nodes") by allowing each node to independently and dynamically make a transmit decision based on both its own capabilities and the capabilities of other local nodes. The Skip-Correlator is capable of being adapted for operation with a wide variety of carrier sensing based wireless communications systems and networks, including, but not limited to, various 802-based standards such as Wi-Fi networks (e.g., IEEE 802.11), ZigBee based networks (IEEE 802.15), city-wide and in-home white space networks, etc. However, for purposes of explanation and discussion, the following discussion will generally refer to the use of 802.11 based Wi-Fi networks.

Any particular wireless or Wi-Fi device may act as either or both a receiver node or a transmitter node at any particular time. In other words, the Skip-Correlator provides carrier sensing symmetry techniques that automatically adapt to various transmit powers used by nodes within range of each other. As a result, the Skip-Correlator allows local Wi-Fi devices to fairly share available spectrum. Advantageously, the Skip-Correlator enables carrier sensing symmetry between Wi-Fi devices without requiring the use of fixed carrier sensing thresholds.

In various implementations, the Skip-Correlator implements carrier sensing symmetry via a skip-correlation process wherein each transmitter node transmits a variable length preamble in front of each packet that is detected or received by other local or neighboring wireless sensor or receiver nodes. This skip-correlation process then correlates selected portions of received preambles based on the receiving node's transmission power in a way that achieves carrier sensing symmetry at the physical layer.

For example, in various implementations, the Skip-Correlator is implemented via a plurality of receivers and transmitters of wireless communications devices. In general, receivers of a first wireless communications device are configured to receive a preamble of a transmitter of a neighboring wireless communications device. In various implementations, this preamble includes an indication of a transmission power level of the neighboring wireless communications device. In various implementations, the first wireless communications device selects and correlates a subset of samples of the received preamble as a function of a transmission power level of the first wireless communications device. The remaining samples of the preamble are skipped by the first wireless communications device, hence the use of the term "Skip-Correlator." Further, in various implementations, the first wireless communications device computes a total preamble energy of the correlated samples of the received preamble. The first wireless communications then device implements carrier sensing symmetry between itself and the neighboring wireless communications device as a function of the total preamble energy. In various implementations, the total preamble energy is used to provide a variable carrier sensing threshold that is applied by the first wireless communications device to determine whether a particular wireless channel is free for transmissions relative to the neighboring wireless communications device.

The Skip-Correlator described herein provides various techniques for ensuring carrier sensing symmetry between wireless communications devices, thereby enabling fair sharing of available spectrum of a wireless channel between the wireless communications devices. In addition to the benefits described above, other advantages of the Skip-Correlator will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
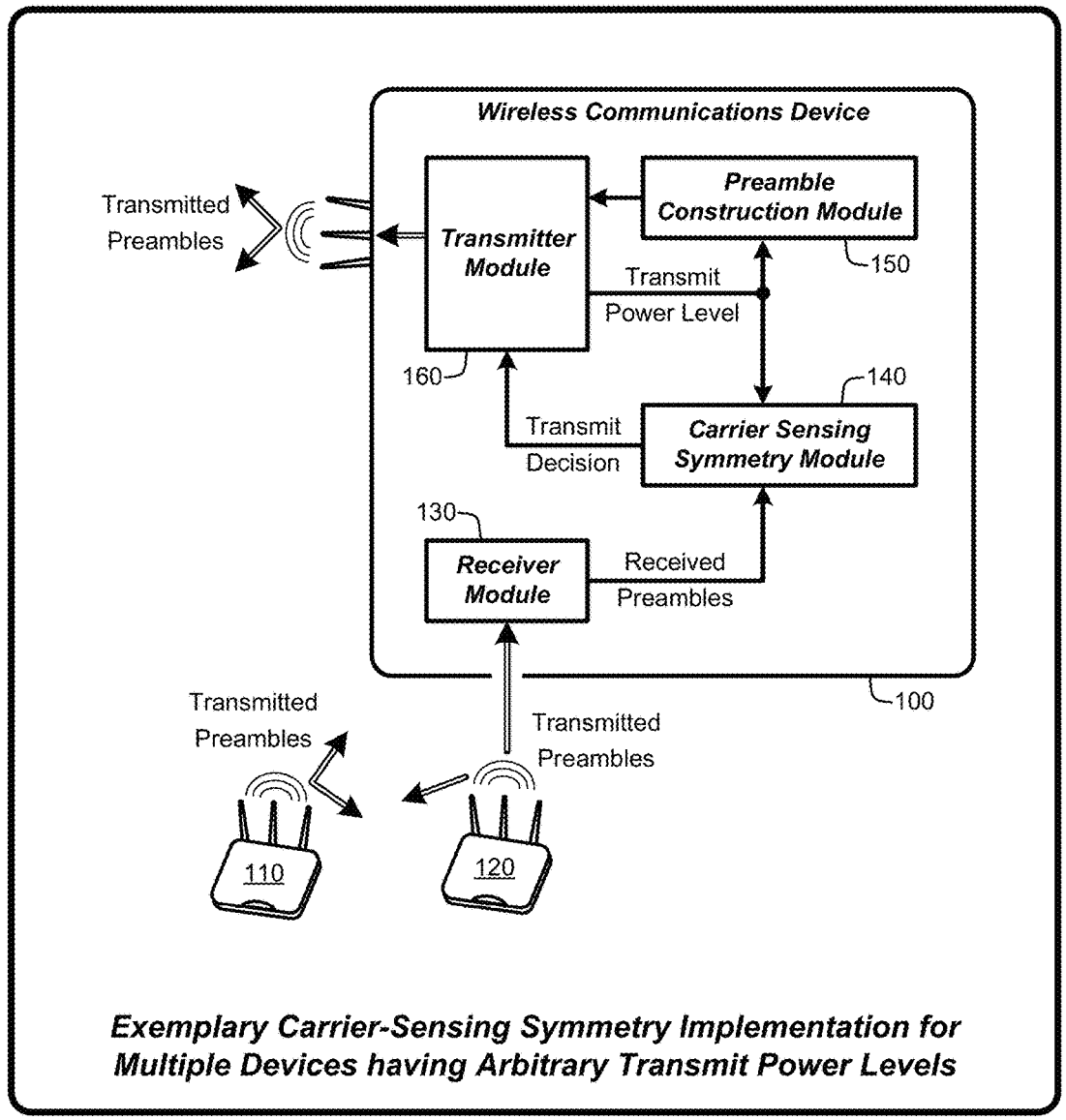
FIG. 1 provides an exemplary architectural flow diagram that illustrates program modules for implementing various implementations of a "Skip-Correlator," as described herein.

In the following description of various implementations of a "Skip-Correlator," reference is made to the accompanying drawings, which form a part hereof, and in which is shown by way of illustration specific implementations in which the Skip-Correlator may be practiced. Other implementations may be utilized and structural changes may be made without departing from the scope thereof.

Specific terminology will be resorted to in describing the various implementations described herein, and it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Skip-Correlator. Further, the appearance of such phrases throughout the specification are not necessarily all referring to the same implementation, and separate or alternative implementations are not mutually exclusive of other implementations. The order described or illustrated herein for any process flows representing one or more implementations of the Skip-Correlator does not inherently indicate any requirement for the processes to be implemented in the order described or illustrated, and any such order described or illustrated herein for any process flows do not imply any limitations of the Skip-Correlator.

As utilized herein, the terms "component," "system," "client," "host," "server," and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server itself can be a component. One or more components can reside within a process and a component can be localized on one computer and/or distributed between two or more computers. Further, in the context of the Skip-Correlator, any of a plurality of networked servers may concurrently or separately act as either or both client computing devices and host computing devices. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

The Skip-Correlator described herein is capable of being adapted for operation with a wide variety of carrier sensing based wireless communications systems and networks, including, but not limited to, various 802-based standards such as Wi-Fi networks (e.g., IEEE 802.11), ZigBee based networks (e.g., IEEE 802.15), city-wide and in-home white space based networks, etc. As such, the Skip-Correlator is not limited to use with IEEE 802.11 based Wi-Fi devices or networks. However, for purposes of explanation and discussion, the following discussion will generally refer to the use of 802.11 based Wi-Fi networks for various exemplary implementations of the Skip-Correlator.

In contrast to conventional "carrier sensing" techniques for determining whether a particular wireless channel is free, "carrier sensing symmetry" is defined herein as the equivalence between the carrier sense detection probability distributions for any two wireless communications devices (also referred to herein as "nodes"), irrespective of their transmit power levels. Any particular wireless communications device may act as either or both a receiver node or a transmitter node at any particular time. In other words, as defined herein, carrier sensing between two nodes is symmetric when the carrier sense detection probability distributions are equivalent between those two nodes. Formally, carrier sensing symmetry may be defined as follows:

Probability of Device A carrier sensing the transmission of Device B⇔

Probability of Device B carrier sensing the transmission of Device A

In general, the Skip-Correlator ensures carrier sensing symmetry between multiple wireless communications devices or nodes. In various implementations, this carrier sensing symmetry is achieved by enabling each node to independently and dynamically choose or adapt its transmit decisions based on both its own capabilities and the capabilities of other local nodes. In other words, these carrier sensing symmetry techniques enable wireless communications nodes to automatically adapt to various transmit powers used by other local nodes. These features of the Skip-Correlator enable wireless communications devices to fairly share available spectrum. Advantageously, carrier sensing symmetry between wireless communications devices is achieved without requiring the use of fixed carrier sensing thresholds.

For example, with respect to Wi-Fi based wireless communications devices, when existing Wi-Fi transmitters transmit data packets, they typically include a preamble in that transmission. Many existing Wi-Fi carrier sensing techniques correlate all of the samples in preambles received from other Wi-Fi transmitters when performing carrier sensing for purposes of determining whether a particular Wi-Fi channel is free.

In contrast, rather than correlating all samples of the preamble, a receiver node implementing the symmetry-based skip-correlation processes described herein correlate a selected subset of samples of received preambles. This selected subset of samples is determined as a function of the transmit power of the receiving node. The remaining samples of the preamble are skipped or ignored by the receiving node. Further, transmitter nodes implementing the skip-correlation processes described herein transmit a preamble having a length (e.g., number of samples) that is determined as a function of the transmit power of that transmitting node. The length of the transmitted preamble in combination with the pattern of samples selected/skipped by the receiver node ensures that a computed total preamble energy accumulated at each end of any wireless link is equivalent. This total preamble energy is then applied to ensure carrier sensing symmetry between any two nodes.

For example, in various implementations, carrier sensing symmetry is implemented via a skip-correlation process wherein each transmitter node transmits a variable length preamble in front of each packet. This variable length preamble is detected or received by other local sensor or receiver nodes. A selected subset of samples of the received preamble is then correlated to achieve carrier sensing symmetry at the physical layer. A total preamble energy is then computed from the correlated samples and applied to ensure carrier sensing symmetry. This skip-correlation process is based on the observation that the carrier sense detection probability distributions will be equivalent at any two nodes if the total preamble energy received by those nodes during sensing are equivalent, despite any difference in their transmit powers. This observation is referred to herein as the "Preamble Energy Equivalence Principle."

Advantageously, the skip-correlation based processes described herein are extensible to multi-node configurations (e.g., three or more nodes) having arbitrary transmit power levels, thereby enabling fair sharing of available spectrum between multiple nodes, regardless of the transmit powers of those nodes.

1.1 System Overview:

As mentioned above, the Skip-Correlator provides various techniques for ensuring carrier sensing symmetry between wireless communications devices, thereby enabling fair sharing of available spectrum of a wireless channel between the wireless communications devices. The processes summarized above are illustrated by the general system diagram of FIG. 1.

The system diagram of FIG. 1 illustrates various implementations for of the Skip-Correlator for ensuring carrier sensing symmetry between Wi-Fi devices, thereby enabling fair sharing of available spectrum of a Wi-Fi channel between the Wi-Fi devices. Furthermore, while the system diagram of FIG. 1 illustrates a high-level view of various implementations of the Skip-Correlator, FIG. 1 is not intended to provide an exhaustive or complete illustration of every possible implementation of the Skip-Correlator as described throughout this document.

For example, consider FIG. 1, which illustrates a plurality of neighboring Wi-Fi devices (100, 110, 120). While only illustrated with respect to Wi-Fi device 100 for purpose of clarity, in various implementations each of these Wi-Fi devices (100, 110, 120), includes a receiver module 130, a carrier sensing symmetry module 140, a preamble construction module 150, and a transmitter module 160. Any or all of the Wi-Fi devices (100, 110, 120) may include additional features, capabilities, interfaces, etc., and are not required to have the same additional features, capabilities, interfaces, etc.

In general, the receiver module 130 of each Wi-Fi device (100, 110, 120) is capable of receiving Wi-Fi signals transmitted from any other Wi-Fi device within transmission range. The transmitter module 160 of each Wi-Fi device (100, 110, 120) is capable of transmitting Wi-Fi signals to any other Wi-Fi device within range of such transmissions. Techniques for receiving and transmitting Wi-Fi signals are well-known and will not be described in detail herein. In various implementations, Wi-Fi devices (100, 110, 120) transmit at some arbitrary fixed or adjustable power level that is known the particular Wi-Fi device that is transmitting.

Whenever any of the Wi-Fi devices (e.g., 100) receives a transmitted preamble from another Wi-Fi device (e.g., 110 or 120) via receiver module 130, the received preamble is passed to a carrier sensing symmetry module 140 by the receiver module. In various implementations, the carrier sensing symmetry module 140 of the Wi-Fi device that receives the preamble (e.g., 100) correlates a subset of samples from the received preamble that are selected from that preamble as a function of a power level of the transmitter module 160 of that Wi-Fi device. In various implementations, the Wi-Fi device that receives the preamble (e.g., 100) then computes a total preamble energy of the correlated samples of the Wi-Fi preamble. In various implementations, the Wi-Fi device that receives the preamble (e.g., 100) then applies the total preamble energy as a variable carrier sensing threshold (e.g., $C_{th}$) to determine whether the Wi-Fi channel on which the preamble was received is free for transmissions by the Wi-Fi transmitter 160 of that Wi-Fi device. Different variable carrier sensing thresholds (e.g., $C_{th}$) are computed for each possible pair of Wi-Fi devices based on Wi-Fi preambles received from other Wi-Fi devices. This process ensures carrier sensing symmetry between any of the possible pairs of Wi-Fi devices in a particular neighborhood of such devices.

Whenever any of the Wi-Fi devices (e.g., 100) transmits a Wi-Fi preamble to one or more other Wi-Fi devices (e.g., 110 or 120), the transmitting Wi-Fi device first applies the variable carrier sensing thresholds (e.g., $C_{th}$) computed for each of the other neighboring Wi-Fi devices to determine whether the Wi-Fi channel is free for transmission of a data packet. Assuming that the Wi-Fi channel is determined to be free, the transmitting Wi-Fi device (e.g., 100) then constructs and transmits a Wi-Fi preamble with each transmitted data packet. This Wi-Fi preamble is constructed by the preamble construction module 150 of the transmitting Wi-Fi device (e.g., 100). In various implementations, the preamble construction module 150 constructs the Wi-Fi preamble in part, from samples of a typical Wi-Fi STS preamble. These samples are selected by the preamble construction module 150 from the Wi-Fi STS preamble as a function of the power level of the transmitter module 160 of the transmitting Wi-Fi device (e.g., 100). Examples of sample selection for preamble construction are described in further detail herein with respect to FIG. 5, FIG. 6 and FIG. 10.

2.0 Operational Details of the Skip-Correlator:

The above-described program modules are employed for enabling various implementations of the Skip-Correlator. As summarized above, the Skip-Correlator provides various techniques for ensuring carrier sensing symmetry between Wi-Fi devices, thereby enabling fair sharing of available spectrum of a Wi-Fi channel between the Wi-Fi devices. The following sections provide a detailed discussion of the operation of various implementations of the Skip-Correlator, and of exemplary methods for implementing the program modules and features described in Section 1 with respect to FIG. 1. In particular, the following sections provides examples and operational details of various implementations of the Skip-Correlator, including:

An operational overview of the Skip-Correlator;
Carrier sensing;
Sensing transmitters with different transmit powers;
Exemplary approaches for maintaining sensing symmetry;
Sensing symmetry using skip-correlation; and
Example designs and implementations.

2.1 Operational Overview:

In general, the Skip-Correlator provides various techniques for ensuring carrier sensing symmetry between Wi-Fi devices of arbitrary transmission power levels, thereby enabling fair sharing of available spectrum of a Wi-Fi channel between the Wi-Fi devices. In various implementations, receivers of a Wi-Fi device receive Wi-Fi preambles from neighboring Wi-Fi transmitters. This Wi-Fi preamble includes an indication of a transmission power level of the neighboring Wi-Fi transmitter. The Wi-Fi device then selects and correlates a subset of samples of the received Wi-Fi preamble as a function of a transmission power level of that Wi-Fi device. The remaining samples of the preamble are skipped by the receiving Wi-Fi device, hence the use of the term "Skip-Correlator." Further, the Wi-Fi device computes a total preamble energy of the correlated samples of the received Wi-Fi preamble. The Wi-Fi device then implements carrier sensing symmetry between itself and the neighboring Wi-Fi transmitter as a function of the total preamble energy.

2.2 Carrier Sensing:

Carrier sensing in Wi-Fi is achieved by transmitting a preamble signal ahead of packet transmissions. During carrier sensing, Wi-Fi devices continuously try to detect the presence of this preamble in signals received from other Wi-Fi devices. Typically, the preamble used for carrier sensing, called the Short Training Sequence (STS), is 160 samples long with a duration of 8 μs.

Figure 2:
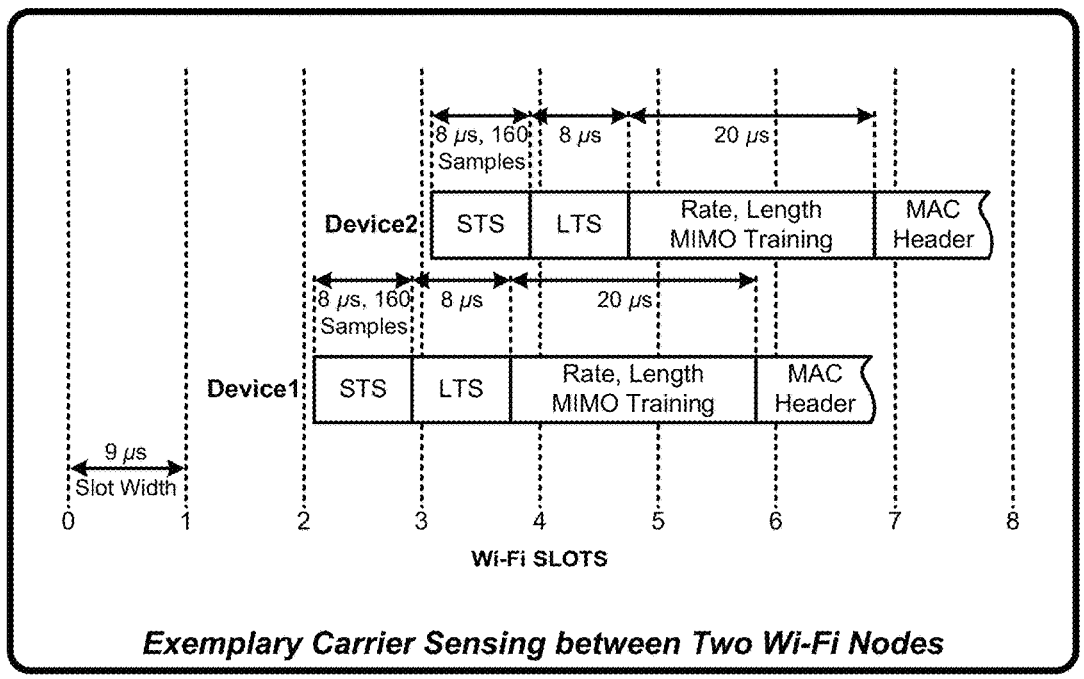
FIG. 2 illustrates a typical carrier sensing session between two Wi-Fi devices to provide carrier sense multiple access (CSMA).

In typical carrier sensing scenarios, any two Wi-Fi devices can try to share spectrum of a particular Wi-Fi channel. For example, in a two-device scenario, as illustrated by FIG. 2, the two Wi-Fi devices (e.g., "Device1" and "Device2") begin by generating a random counter. Assume that in the example illustrated in FIG. 2, Device1 generates a counter value of 2 and Device2 generates a counter value of 3. Every 9 μs (i.e., the Wi-Fi slot-width in this example) the Wi-Fi devices decrement their counters. Device1 counts-down to 0 first at the beginning of slot 2 and initiates its transmission. Device2 continues to listen and detects the STS in the preamble transmitted by Device1 before the end of Slot 2 and backs-off, avoiding a collision. However, if Device2 were unable to detect the STS from Device1 before the beginning of slot 3, then its counter would have reached 0 and it would have transmitted its packet causing a packet collision.

Unfortunately, preambles transmitted by any particular Wi-Fi device may not be "detected" (or carrier sensed) by other Wi-Fi devices for various reasons. For example, assuming that S(n) is the preamble of length L samples that is transmitted by a Wi-Fi device. Then, the received signal $S_{recv}(n)$ when no preamble is transmitted (i.e., "NoXmit"), and when a preamble is transmitted (i.e., "Xmit") is given by:

$$S_{recv}(n) = \begin{matrix} N(n), & NoXmit \\ R(n) + N(n), & Xmit \end{matrix} \qquad \text{Equation (1)}$$

$$R(n) = S(n) * H. \qquad \text{Equation (2)}$$

In Equations (1) and (2), N(n) is the receiver noise, H is the channel response that captures how the channel transforms the transmitted signal into the received signal R(n) due to effects such as multi-path fading, and * is the convolution operation. The purpose of detection techniques is to reliably distinguish between the no transmission and transmission scenarios in Equation (1) based on $S_{recv}(n)$. There are a variety of existing detection techniques that are applied for this purpose, e.g., the well-known matched filter detection technique and the well-known Schmidl-Cox detection technique.

In general, matched filter based detection techniques are implemented by applying the receiver node to computes a normalized cross-correlation of the entire preamble with the received signal as:

$$C = \left| \sum_{i=1}^{i=L} S_{recv}^{norm}(i) S^{norm}(i) \right|^2 \qquad \text{Equation (3)}$$

In Equation (3), $S^{norm}$ and $S_{recv}^{norm}$ are scaled versions of S and $S_{recv}$ respectively such that its total energy is 1. If $C > C_{th}$, the channel is deemed busy and otherwise not.

In general, Schmidl-Cox based detection techniques are implemented by evaluating equivalent halves of a signal. More specifically, in typical Schmidl-Cox based detection techniques S(n) comprises two equivalent halves of the signal, i.e., $$S(i) = S\left(i + \frac{L}{2}\right).$$

As the transmission passes through the channel, each of its halves are effected by the channel in exactly the same way. Consequently $$R(i) = R\left(i + \frac{L}{2}\right).$$

The receiver node then correlates two consecutive $$\frac{L}{2}$$

length windows from the received signal as:

$$C = \left| \sum_{i=1}^{i=\frac{L}{2}} S_{recv}(i) S_{recv}\left(i+\frac{L}{2}\right) \right|^2 \qquad \text{Equation (4)}$$

A high correlation between C and a predefined correlation threshold $C_{th}$, i.e., $C > C_{th}$, indicates that a preamble was transmitted (and detected) and the channel is deemed busy.

Due to various drawbacks, matched filter based techniques are typically used less frequently than Schmidl-Cox based techniques for implementing carrier sensing. For example, due to frequency selective fading in the channel, R(n) is often very different from S(n) in Equation (2). Consequently, correlating R(n) with S(n) typically yields a low correlation. In contrast, Schmidl-Cox avoids this issue because both halves are affected by the channel in the same way and thus results in a high correlation. Further, the circuit complexity of implementing a matched filter based technique can be two orders of magnitude greater than that of Schmidl-Cox. Therefore, while matched filter based detection or other detection techniques may be adapted for use in carrier sensing, the following discussion will focus on Schmidl-Cox based detection techniques for purposes of explanation.

2.2.1 Probability Distributions of C in Schmidl-Cox:

Suppose that the noise floor is $\sigma_N^2$ (variance of noise), the distribution of the correlation C when no preamble is transmitted is given by:

$$P(C|NoXmit, \sigma_N^2) = P\left(\left|\sum_{i=1}^{i=\frac{L}{2}} N(i)N\left(i+\frac{L}{2}\right)\right|^2\right) \qquad \text{Equation (5)}$$

Invoking the central limit theorem, the sum of $$N(i)N\left(i+\frac{L}{2}\right)$$

is a zero mean Gaussian with variance $$\frac{L}{2}\sigma_N^4.$$

Thus, $P(C|NoXmit, \sigma_N^2)$ is a $\chi_1^2$ distribution with mean $$\frac{L}{2}\sigma_N^4.$$

Assume that the received preamble energy per sample (signal power) is $E(R(i)R(i)) = \sigma_S^2$ (where E denotes expectation). Further, typical preambles also have $E(R(i)) = 0$. Since $$R(i) = R\left(i+\frac{L}{2}\right),$$

the distribution of C when a preamble is transmitted is given by:

$$P(C|Xmit, \sigma_N^2, \sigma S^2) = \qquad \text{Equation (6)}$$

$$P\left(\left|\sum_{i=1}^{i=\frac{L}{2}} \sigma_S^2 + 2R(i)N(i) + N(i)N\left(i+\frac{L}{2}\right)\right|^2\right)$$

Invoking the central limit theorem, the sum of R(i)N(i) is a zero mean Gaussian with variance $$\frac{L}{2}\sigma_N^2\sigma_S^2.$$

Thus, the distribution of $P(C|Xmit, \sigma_N^2, \sigma S^2)$ is a non-central $\chi_1^2$ distribution with mean at $$\frac{L^2}{4}\sigma_S^4 + L\sigma_N^2\sigma_S^2 + \frac{L}{2}\sigma_N^4.$$

2.2.2 Selection of Correlation Threshold:

Typically, there are two kinds of errors in preamble detection, false negatives and false positives. False negatives occur when a preamble is transmitted but not detected. Conversely, false positives occur when a preamble was not transmitted but erroneously detected. The false negative rate is given by:

$$\eta_-(C|\sigma_N^2,\sigma_S^2) = \int_{c=0}^{C} P(c|Xmit,\sigma_N^2,\sigma_S^2)dc \qquad \text{Equation (7)}$$

and the false positive rate is given by, $$\eta_+(C|\sigma_N^2) = 1 - \int_{c=0}^{C} P(c|noXmit,\sigma_N^2)dc \qquad \text{Equation (8)}$$

Typically, selection of the correlation threshold, $C_{th}$, is based on the current IEEE 802.11 Wi-Fi standard specification of a 10% false negative rate (to provide a 90% detection rate) when the average received power is −82 dBm.

In general, a high false positive rate ($\eta_+$) leads a Wi-Fi device to erroneously conclude that there is an ongoing transmission (i.e., device assumes that the channel is not free), resulting in an unnecessary back-off and loss of throughput. Assuming a false detection rate of $\eta_- = 10^{-2}$, once every 100 samples (5 μs), a preamble will be falsely detected. Since 5 μs<9 μs (Wi-Fi slot width) this means that the Wi-Fi device will end up falsely detecting a preamble in almost every slot and will not be able to transmit any packets. Usually a false detection rate of $\eta_- < 10^{-3}$ provides reasonable performance. At $10^{-3}$, once every 1000 samples or 6 Wi-Fi slots, a preamble is falsely detected. However, upon detecting an STS, the device then uses a Long Training Sequence (LTS) (see FIG. 2) to tune its receiver parameters. If no LTS is detected, then the receiver deems the channel free. The probability of falsely detecting a preamble in the LTS is very low (e.g., $<10^{-6}$). This means that the device will typically lose on average one Wi-Fi slot for every packet transmission. Given that typical Wi-Fi packet transmissions last several 100 s of μs to few milliseconds, this generally results in a throughput drop of <2%.

2.3 Sensing Transmitters with Different Transmit Powers:

In general, the Skip-Correlator adapts typical carrier sensing techniques to implement carrier sensing symmetry based techniques to address carrier sensing issues that arise when Wi-Fi devices transmit at different transmit power levels.

2.3.1 Violation of Carrier Sensing Symmetry:

In accordance with the definition of carrier sensing symmetry provided in Section 1, carrier sensing symmetry can be simply stated as the property that Device A carrier senses the transmission of Device B if and only if Device B carrier senses the transmission of Device A. The absence of carrier sensing symmetry leads to unfair access opportunities.

Figure 3:
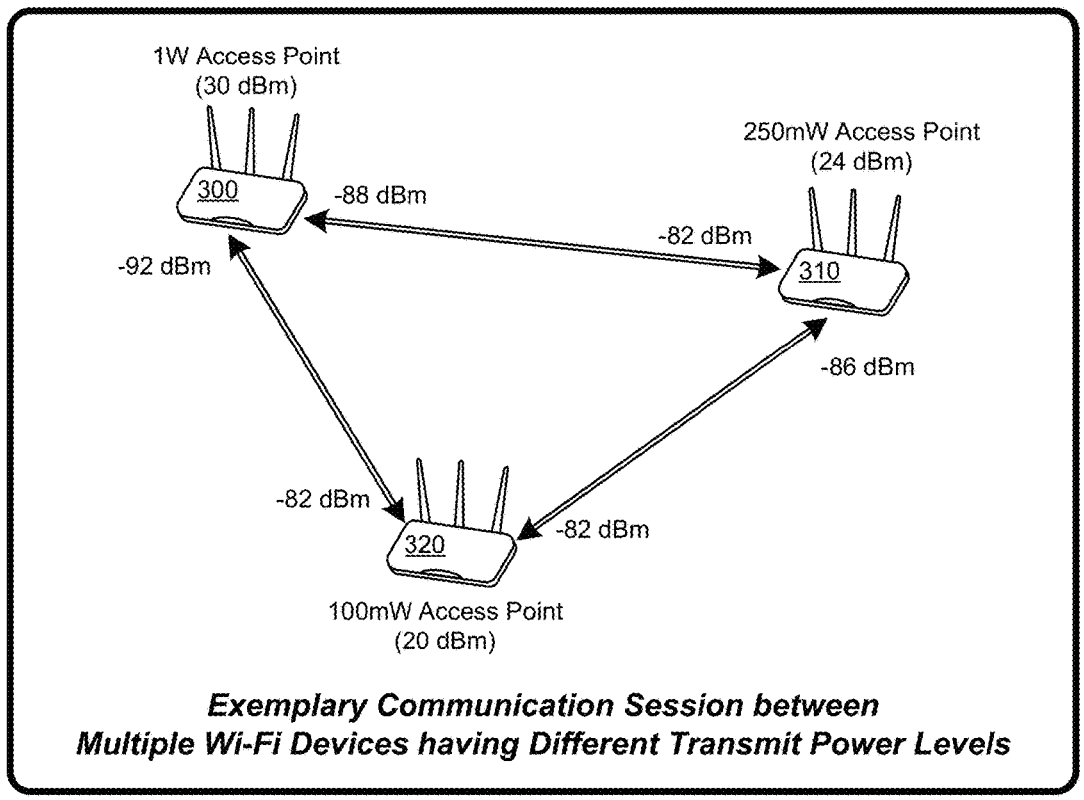
FIG. 3 illustrates an exemplary communication session between multiple Wi-Fi devices having different transmit power levels.

For example, consider the example of multiple Wi-Fi Access Points illustrated by FIG. 3. In this example there are three Wi-Fi Access Points (300, 310 and 320) having different transmit powers. For purposes of simplicity and explanation in this example, it is assumed that the power of transmissions received between any particular pair of Access Points are constant values. As discussed in further detail herein, in actual practice, the received power of any particular transmission tends to vary over time due to vagaries of the wireless channel that include, but are not limited to, multi-path effects.

As illustrated, Access Point 300 has a transmission power of 1 W (30 dBm), Access Point 310 has a transmission power of 250 mW (24 dBm), and Access Point 320 has a transmit power of and 100 mW (20 dBm), respectively. As illustrated by FIG. 3, Access Point 310 and Access Point 320 are placed in such a manner that the transmissions of Access Point 300 are received by the other two Access Points at −82 dBM, which is the energy detection threshold specified in the current IEEE 802.11 Wi-Fi standard. Further, as illustrated, the transmissions of Access Point 310 are also received by Access Point 320 at −82 dBm. Since wireless channels are symmetric with respect to path-loss, and Access Point 320 transmits at a lower power (i.e., 100 mW), transmissions from Access Point 320 are received at Access Point 310 at −86 dBm (i.e., −82 dBm−4 dBm), and at Access Point 300 at −92 dBm (i.e., −82 dBm−10 dBm). Similarly, the transmission from Access Point 320 is received at Access Point 300 at −88 dBm (i.e., −82 dBm−6 dBm).

Based on the current IEEE 802.11 Wi-Fi standard, Access Point 320 (operating at 100 mW) will sense and back-off whenever either Access Point 310 (operating at 250 mW) or Access Point 300 (operating at 1 W) transmit. However, based on the current IEEE 802.11 Wi-Fi standard, neither Access Point 310 (operating at 250 mW) or Access Point 300 (operating at 1 W) will yield to transmissions of Access Point 320 (operating at 100 mW) since those transmissions are received below the fixed energy threshold of −82 dBm defined by the current IEEE 802.11 Wi-Fi standard. Similarly, while Access Point 310 (operating at 250 mW) will sense and back-off when Access Point 300 (operating at 1 W) is transmitting, the reverse is not true. This example illustrates how carrier sensing asymmetry, resulting in unfair use of the available spectrum, can be introduced under the current IEEE 802.11 Wi-Fi standard when transmitters of different power levels exist within range of each other.

2.3.2 Sensing Asymmetry using Different Carrier Sense Thresholds:

The root cause of the carrier sensing asymmetry described with respect to the Access Points illustrated in FIG. 3 is that the current IEEE 802.11 Wi-Fi standard fixes the carrier sensing threshold, $C_{th}$, at −82 dBm irrespective of the transmit powers of the transmitting and receiving devices.

However, as discussed in further detail herein, the Skip-Correlator restores carrier sensing symmetry in the case of multiple different power levels by choosing a variable carrier sensing threshold on a per packet basis depending on the transmit powers of both the transmitter and the receiver. In particular, whenever, a Wi-Fi device with lesser power transmits, listening devices implementing the Skip-Correlator based techniques described herein lower their carrier sensing threshold by the difference of their powers. Equation 9 illustrates an example of this variable carrier sensing threshold, $E_{th}$, that can be used to restore carrier sensing symmetry when the different transmit powers of the transmitter and receiver are $P_{Xmit}$ and $P_{Recv}$, respectively.

$$E_{th} = -82\text{dBm} - \max(P_{Recv} - P_{Xmit}, 0) \qquad \text{Equation (9)}$$

One consideration of this approach is that carrier sensing is typically the first action performed by the receiver when determining whether a channel is free. Given that the identity and features of all Wi-Fi devices in a particular area are typically not known a priori, or may change frequently, the transmission powers of such devices are generally not known to each other. The Skip-Correlator based techniques described herein address these issues in a way that ensures carrier sensing symmetry between unknown devices having arbitrary transmission power levels.

2.3.3 Carrier Sensing Symmetry Discussion:

As described herein with respect to FIG. 3, it was assumed the various power of signals received between any two nodes or access points were constant values for simplicity. However, in practice, the received signal tends to vary significantly due to vagaries of the wireless channel such as multi-path effects or other channel issues. Given this variation, determining the carrier sensing threshold based on a single point (e.g., 10% false positive) does not guarantee sensing symmetry in its strictest sense, since it is expected that various values of C will be observed as the received signal strength varies. In order to satisfy the condition "Device A carrier senses the transmission of Device B if and only if Device B carrier senses the transmission of Device A" the detection probabilities $P(C > C_{th})$ must be equivalent for any values of received signal strengths at both A and B. In other words, for carrier sensing symmetry, the Skip-Correlator based techniques described herein ensure that the carrier sense detection probability distributions, and hence $\eta_-$ curves, are equivalent between any two nodes. As discussed in further detail herein, the Skip-Correlator guarantees this strict property by making sure that the distributions themselves are equivalent for both devices A and B.

2.3.4 Low-Power Device Starvation:

The issue of transmission "starvation" often arises where one Wi-Fi device transmits at a higher power than another Wi-Fi device within the same local area. In this case, depending on power levels and distance between devices, the higher power device may not detect (or carrier sense) transmissions of the lower power device at a level above the carrier sensing threshold, $C_{th}$. Conversely, the lower power device will typically carrier sense the transmissions of the higher power device at a level exceeding the carrier sensing threshold. Consequently, assuming that these devices follow the current IEEE 802.11 Wi-Fi standard, the lower power device will back off from transmissions whenever the higher power device is transmitting. As a result, the lower power device may be unable to transmit for extended periods of time, thereby suffering from starvation.

Figure 4:
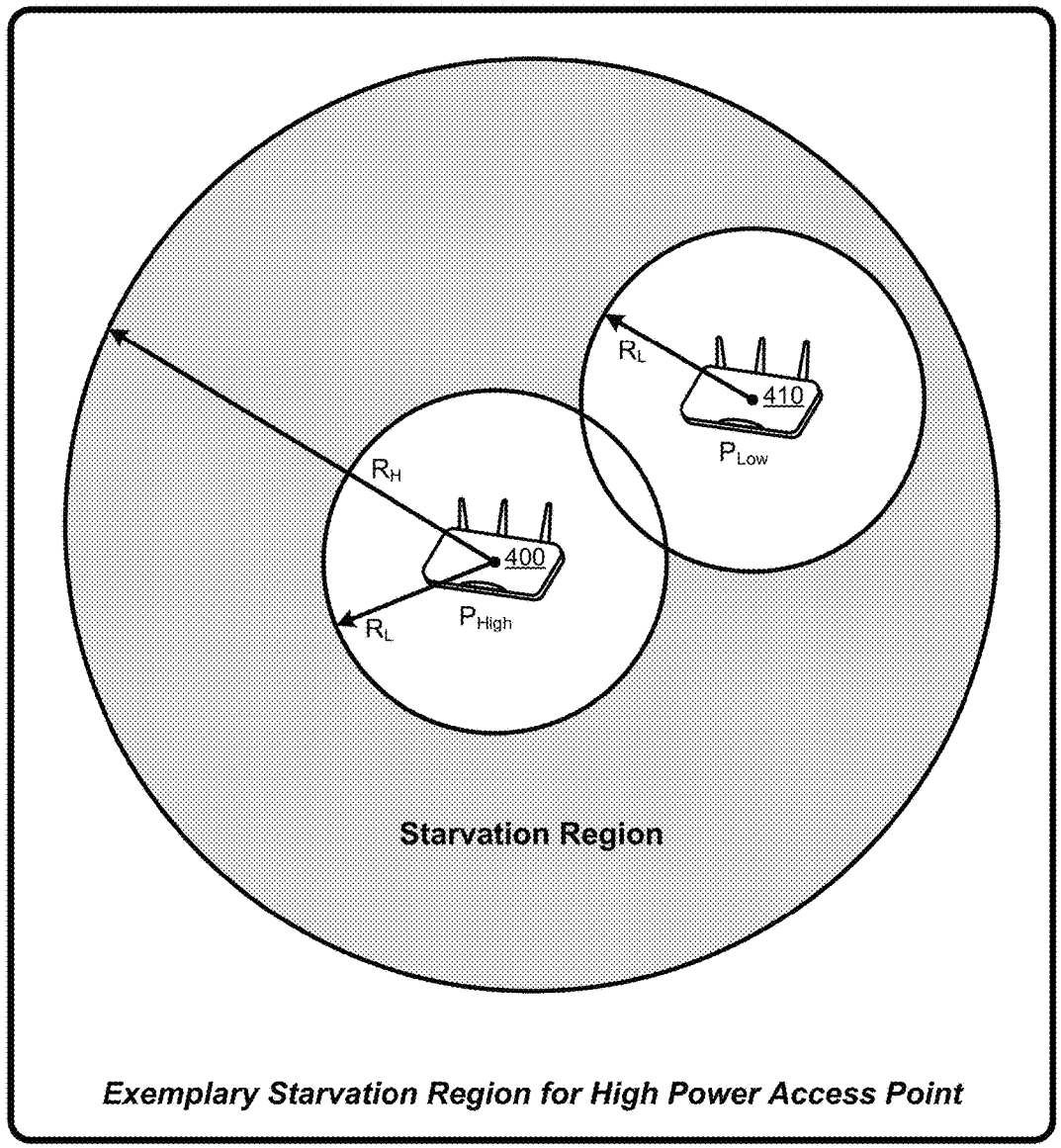
FIG. 4 illustrates an exemplary starvation region for a high power Wi-Fi device.

For example, as illustrated by FIG. 4, consider a high power Access Point 400 transmitting at power $P_{High}$ and a low power Access Point transmitting at power $P_{Low}$. In this example, $R_H$ is the distance at which the transmit power of high power Access Point 400 falls to −82 dBm. Similarly, in this example, $R_L$ is the distance at which the transmit power of low power Access Point 410 falls to −82 dBm. Consequently, these distances are the farthest another device will be able to carrier sense them under the current IEEE 802.11 Wi-Fi standard. Using the log-distance path loss model, the received power at a distance d is given by:

$$P_{Recv} = P_{Xmit} - 10\gamma \log(d) \quad \text{Equation (10)}$$

Based on Equation (10), the ratio $$\frac{R_H}{R_L} = 10^{\frac{P_H - P_L}{10\gamma}}.$$

Thus, it can be seen that low-power devices in the region $d > R_H - R_L$ will starve (gray shaded region in FIG. 4). Assume that in indoor spaces, $\gamma = 3-4$, while in open spaces, $\gamma = 2-3$. Therefore, in view of Equation (10), whenever a high power device transmits with a power difference is 10 dB (10×) relative to low power devices, starvation of those low power devices in indoor spaces may occur in approximately 70% of the coverage region of the high power device. Similarly, whenever a high power device transmits with a power difference is 10 dB (10×) relative to low power devices, starvation of those low power devices in open spaces may occur in approximately 90% of the coverage region of the high power device. Further, even at a mere 3 dB power difference, starvation of low power devices may occur in approximately 30% to 50% of the coverage region of the high power device. Consequently, channel sense asymmetry is a concern in the vicinity of high power transmitters.

2.3.5 Use of Conservative Thresholds:

One way to avoid starvation of low-power nodes is to choose the most conservative thresholds for high power devices. For example, in FIG. 3, the Access Point 300 (operating at 1 W) could use a carrier sensing threshold of −92 dBm. Similarly, Access Point 310 (operating at 250 mW) could use a carrier sensing threshold of −86 dBm. Finally, Access Point 320 (operating at 100 mW) can continue to use a carrier sensing threshold of −82 dBm. While the use of these types of conservative thresholds will solve the starvation issue for any of the lower power nodes illustrated in FIG. 3, it will instead result in a severe exposed terminal issue (e.g., missed transmission opportunities) for the higher powered nodes.

For example, given these conservative thresholds, two high power Access Points, both operating at 1 W, will now back-off upon sensing the other at −92 dBm when they should not be backing off at powers <−82 dBm. The fraction of scenarios for which these high power nodes will unnecessarily back off from one another can be shown to be the same as the fraction of low power devices (operating at 100 mW) starving when the threshold was a static −82 dBm (e.g., 73-90%). Thus, the use of conservative static thresholds results in merely shifting the issue from low-power device starvation to exposed high-power devices. In contrast, choosing variable carrier sensing thresholds based on Equation (9) ensures that no device suffers unfair access or starvation irrespective of its transmit power level.

2.4 Exemplary Approaches for Maintaining Sensing Symmetry:

In view of the preceding discussion, in order to maintain sensing symmetry, listening devices can choose a variable sensing threshold that depends on their own transmit power and that of the transmitter, as illustrated by Equation (9). The following paragraphs consider two exemplary approaches to implement carrier sensing symmetry in view of Equation (9). The first of these approaches is based on the use of packet headers in a way that enables each device to maintain a table or list of the transmit powers of its identified neighbors. The second of these approaches is based on the use of orthogonal preambles to encode the power level of each transmitter. Finally, a third approach, detailed in Section 2.5, describes the use of skip-correlation to maintain sensing symmetry. While each of these three approaches provides workable implementations of the Skip-Correlator, the approach described in Section 2.5 has been observed to be more efficient than the two approaches described in Sections 2.4.1 and 2.4.2.

2.4.1 Sensing Symmetry Using Packet Headers:

In this first approach, each device maintains a table of transmit powers of all its neighbors. The listening device decodes the headers of the received packet to determine the identity of the transmitter and looks up the power of the transmission to make the carrier sensing decision. Alternatively, the transmitting device could add an additional field in the headers that contains transmit power information—this would avoid the need for the lookup. One drawback of these approaches is that they headers are decoded before the back-off decision can be taken. The increase in the time to make this decision results in reduced 802.11 MAC efficiency due to slot-width inflation.

For example, in view of the preceding discussion, if the back-off decision does not occur within a Wi-Fi slot then it can result in packet collisions. The identity of the transmitting device is provided in the MAC header which arrives about 50 μs into the packet transmission. If an additional power level field is added to the header, the earliest this can be done is in the OFDM symbol immediately after the LTS, because LTS is used for frequency offset estimation which is preformed prior to decoding. Thus, the slot-width would have to be at least 20 μs (LTS+STS+1 OFDM Symbol) and in practice a bit more, resulting in more than doubling of the slot width. This in turn would result in the average backoff interval to be doubled, thereby reducing MAC efficiency especially for small packets.

2.4.2 Sensing Symmetry using Orthogonal Preambles:

In this approach, a different preamble $S_{P_{Xmit}^k}$ is assigned to each power level $P_{Xmit}^k$. Each of these preambles are orthogonal to the others and have low cross-correlation properties (e.g., like CDMA codes). Thus, each preamble encodes the transmit power level information within itself. A device then transmits the preamble corresponding to its transmit power level. Listening devices now correlate against all possible preambles simultaneously using a matched-filter bank and use an energy threshold for each correlator given by Equation (9) to decide whether or not to back-off.

There are two drawbacks to this approach, including a high complexity of implementation and relatively poor performance in inferring the correct power level. Since Schimdl-Cox is oblivious to the exact preamble transmitted, it cannot be used in this approach (unless modified to process different preambles) as it will be unable to distinguish between the different preambles. For example, with respect to complexity, for 4 different power levels this approach uses over 1500 multipliers while Schimdl-Cox used with the skip-correlation based techniques described herein uses only 5 multipliers for four different power levels. The second drawback arises from the ability to distinguish between different preambles and inferring the correct preamble through cross-correlation. For example, for 4 power levels, even at 128 samples long, the incorrect preamble detections are as high as 14%. Further, using preambles longer than 128 samples will increase Wi-Fi slot width resulting in low MAC efficiency. Further, drawbacks relating to the use of orthogonal preambles also apply to other implementations such as time and frequency synchronization based techniques.

2.5 Sensing Symmetry using Skip-Correlation:

The following paragraphs describe the use of skip-correlation implement carrier sensing symmetry in view of Equation (9). In various implementations, the Skip-Correlator implements these techniques by reusing Wi-Fi's preamble (STS) and most of Wi-Fi's carrier sensing circuits while adding very little extra circuitry (via either or both hardware circuitry or software defined radios such as WARP or other software defined radio). Further, although the following implementation of skip-correlation is described in terms of a Schmidl-Cox based implementation, any desired detection technique, including, but not limited to, matched filter based techniques may be adapted for use in implementing the skip-correlation based techniques described herein.

In various implementations, the Skip-Correlator implements the skip-correlation based techniques described herein by skipping of parts of the preamble by transmitters and receivers to support arbitrary power levels. In Skip-correlation, transmitters, instead of transmitting the entire preamble, transmit only certain pieces and skip the rest. Similarly, receivers correlate against only specific parts of the preamble while skipping the rest. The specific pieces of the preamble to be skipped by the transmitters and receivers depend on their transmit power levels and are arranged such that the total preamble energy (received power times the number of samples in the preamble) seen by a receiver is equivalent, irrespective of the transmit powers of the transmitter and the receiver. As discussed in the following paragraphs, ensuring that devices have equivalent preamble energies for all wireless links ensures sensing symmetry due to the aforementioned Preamble Energy Equivalence Principle described below.

2.5.1 Preamble Energy Equivalence Principle:

Skip-Correlation uses a property of preamble detection, referred to as the Preamble Energy Equivalence Principle, which dictates that if the total preamble energy received at two devices are equivalent, then their detection characteristics will also be equivalent. As an example, consider two devices D1 and D2 that receive the preamble at power levels $P_1$ and $P_2$. If D1 uses $L_1$ samples of the preamble for detection while D2 uses $L_2$ samples so that $P_1 L_1 \approx P_2 L_2$, i.e., the total preamble energy received is equivalent, then the probability distribution of C in Equation (6) at devices D1 and D2 will be equivalent.

In particular, the total received preamble energy for an L sample preamble is given by $E_{pre} = L\sigma_S^2$. Thus, P(C|noXmit) (e.g., Equation (5)), can be re-written as a non-central $\chi_1^2$ distribution with mean at $$\frac{E_{pre}^2}{4} + E_{pre}\sigma_N^2 + \frac{L}{2}\sigma_N^4.$$

Since the noise floor $\sigma_N^2$ is a constant, except for the term $$\frac{L}{2}\sigma_N^4$$

that depends on L, the entire distribution is a function of $E_{pre}$. Further, when L is chosen to reduce false positives to under a level such as $10^{-3}$, the contribution of this term to the overall distribution becomes insignificant. Thus, the distribution becomes a function of $E_{pre}$ that merely depends on the total energy of the preamble being correlated.

2.5.2 Notation Used:

In general, the entire preamble has L samples and is denoted by $S = [S_1, S_2, \ldots, S_L]$ with its left half $S^{LH}$ equivalent to its right half $S^{RH}$. The preamble transmitted by a device with power level P comprising multiple parts is denoted by $S_P^{Xmit}$ with its right and left halves as $S_P^{Xmit,LH}$ and $S_P^{Xmit,RH}$. Similarly, the preamble correlated against while listening is denoted by $S_P^{Recv}$ comprising $S_P^{Recv,LH}$ and $S_P^{Recv,RH}$ as its equivalent left and right halves. For indicating a part of the preamble from sample index i to j the notation $S[i, k] = [S_i, S_j, \ldots, S_k]$ is used. Further, to indicate that a preamble C contains parts from both preambles A and B, the notation $C = A \cup B$ is used. Similarly, $A \cap B$ denotes parts of the preamble that are present in both A and B.

Figure 5:
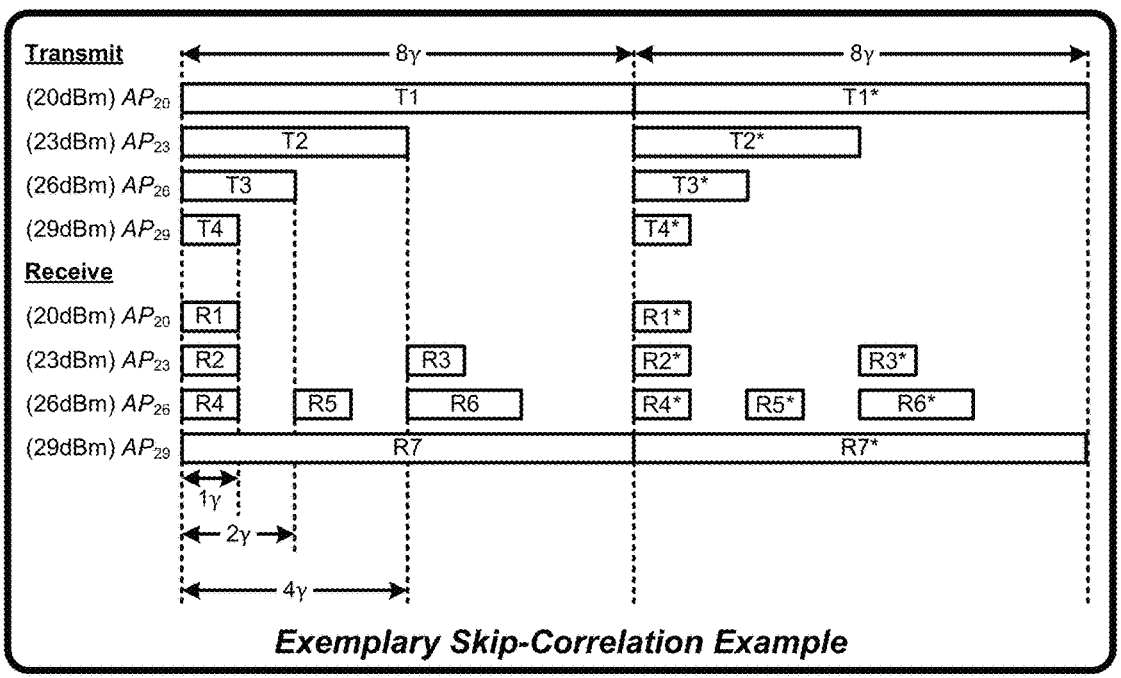
FIG. 5 illustrates an exemplary skip-correlation example for a set of four Wi-Fi devices each having a different transmit power level.

2.5.3 An Example of Skip-Correlation:

For purposes of explanation the following paragraphs describe a simple example, based on Schmidl-Cox detection, of how various implementations of the skip-correlation process operate in a scenario with four Wi-Fi Access Points having different transmit powers. For example, as illustrated by FIG. 5, consider Wi-Fi APs: $AP_{20}$, $AP_{23}$, $AP_{26}$, $AP_{29}$ with transmit power levels 20 dBm (100 mW), 23 dBm (200 mW), 26 dBm (400 mW) and 29 dBm (800 mW), respectively. Assuming Schmidl-Cox detection, the original preamble is $L=16\gamma$ samples long with its two equivalent halves T1 and T1* comprising $8\gamma$ samples each. When implementing the skip-correlation based preambles described herein, the pieces of the preamble that are transmitted by each of the transmitters, and those parts that are skipped or correlated by the receivers, depend on the transmit power of each of those Wi-Fi devices.

Skip-Correlation for the $AP_{29}$, $AP_{20}$ Wi-Fi Device Pair: In accordance with FIG. 5, suppose that $AP_{20}$ transmissions are received at $AP_{29}$ at power P. Therefore, $S_{20dBm}^{Xmit,LH}=S[1,8\gamma]$ (i.e., T1) and $S_{29dBm}^{Recv,LH}=S[1,8\gamma]$ (i.e., R7). Thus, when $AP_{20}$ transmits $AP_{29}$ correlates $S_{20dBm}^{Xmit,LH} \cap S_{29dBm}^{Recv,LH}$ against its equivalent right half. The total preamble energy received is $2 \times P \times 8\gamma = 16P\gamma$. Similarly, when $AP_{29}$ transmits, the received power at $AP_{20}$ will be 8P since it transmits at a 9 dB (8×) higher power. Thus, $S_{29dBm}^{Xmit,LH}=S[1,\gamma]$ (i.e., T4) and $S_{20dBm}^{Recv,LH}=S[1,\gamma]$ (i.e., R1). Thus, when $AP_{29}$ transmits, $AP_{20}$ correlates against the part $S_{29dBm}^{Xmit,LH} \cap S_{20dBm}^{Recv,LH}=S[1,\gamma]$ and the total preamble energy received is $2 \times 8P \times \gamma = 16P\gamma$. Thus, both devices will receive the equivalent total preamble energy of $16P\gamma$.

Skip-Correlation for the $AP_{26}$, $AP_{23}$ Wi-Fi Device Pair: In accordance with FIG. 5, suppose that $AP_{23}$ transmissions are received at $AP_{26}$ at power P'. Thus, $S_{23dBm}^{Xmit,LH}=S[1,4\gamma]$ (i.e., T2) and $S_{26dBm}^{Recv,LH}=S[1,\gamma]$ (i.e., R4)$\cup S[2\gamma+1,3\gamma]$ (i.e., R5)$\cup S[4\gamma+1,6\gamma]$ (i.e., R6). Thus, when $AP_{23}$ transmits, $AP_{26}$ correlates against the part $S_{23dBm}^{Xmit,LH} \cap S_{26dBm}^{Recv,LH}=S[1,\gamma]$ (i.e., R4)$\cup S[2\gamma+1,3\gamma]$ (i.e., R5) and the total preamble energy received is $2 \times P' \times 2\gamma = 4P'\gamma$. When $AP_{26}$ transmits, the received power at $AP_{23}$ will be 2P' since it transmits at a 3 dB (2×) higher power. $S_{26dBm}^{Xmit,LH}=S[1,2\gamma]$ (i.e., T3) and $S_{23dBm}^{Recv,LH}=S[1,\gamma]$ (i.e., R2)$\cup S[4\gamma+1,5\gamma]$ (i.e., R3). When $AP_{26}$ transmits, $AP_{23}$ correlates against $S_{26dBm}^{Xmit,LH} \cap S_{23dBm}^{Recv,LH}=S[1,\gamma]$ (i.e., R2) and the total preamble energy received is $2 \times 2P' \times \gamma = 4P'\gamma$. Thus, both devices receive the equivalent total preamble energy of $4P'\gamma$.

Similarly, for all possible pairs of devices in the example of FIG. 5, the total preamble energy can be verified to be equivalent, thereby ensuring in sensing symmetry across all wireless links. Further, it is to be understood that the Skip-Correlator is not limited to the use of Wi-Fi devices of the four power levels described for purposes of explanation, and is not limited to only four power levels. For example, different lengths of preambles, in combination with different preamble pieces selected for transmission and different preamble pieces from that transmission selected for correlation enable the Skip-Correlator to operate with any number of Wi-Fi devices operating at any number of different power levels to ensure carrier sensing symmetry between those devices. A discussion of the case for any number of Wi-Fi devices operating at any number of different power levels is described in Section 2.5.4 of this paper.

2.5.4 Skip-Correlation for Arbitrary Transmit Powers:

The following paragraphs describe skip-correlation for general scenarios where devices may choose from N distinct power levels $P_1 < P_2 < \ldots < P_N$. For example, assume that transmit power levels of Wi-Fi devices are discretized to either 1 dBm or 3 dBm values. The following example, discussed with reference to FIG. 6, describes how the preamble pieces may be defined for a device transmitting at power level $P_r$.

Figure 6:
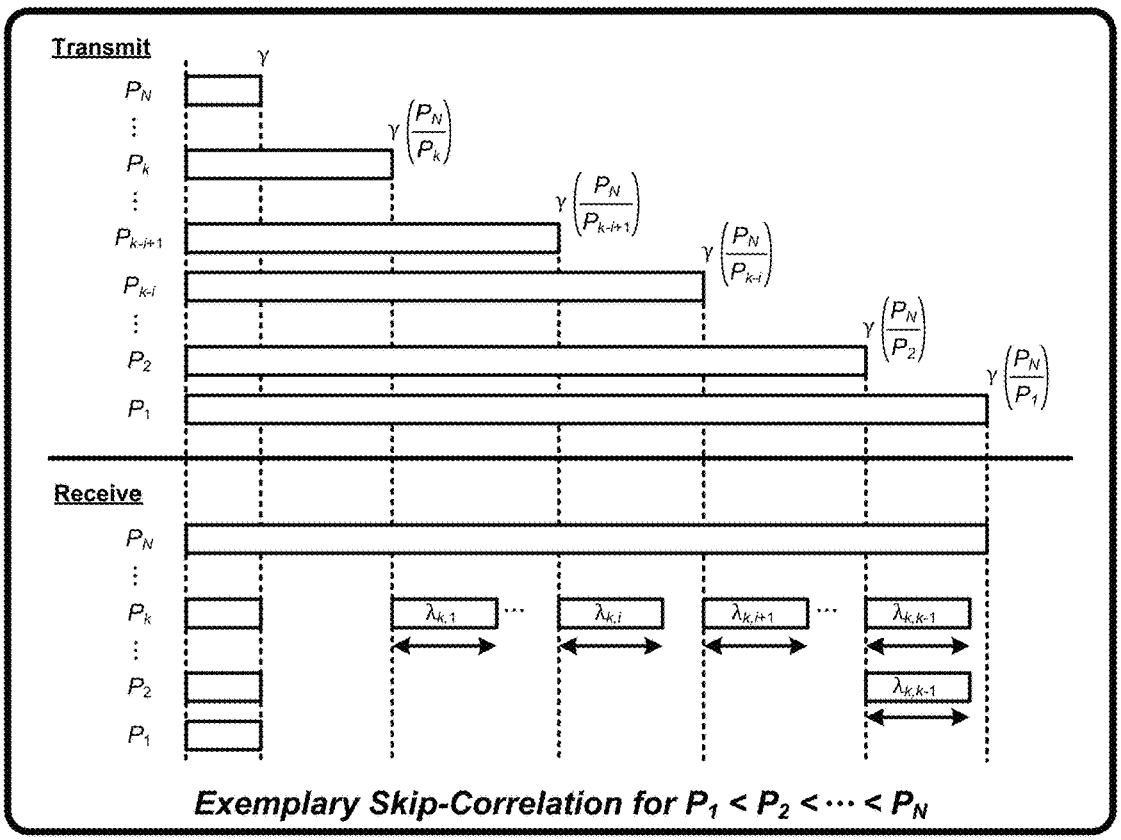
FIG. 6 illustrates exemplary skip-correlation for an arbitrary number of Wi-Fi devices having arbitrary transmit power levels.

For the following discussion, again based on Schmidl-Cox detection, assume the use of a preamble S that has $$L = 2\gamma\left(\frac{P_N}{P_1}\right)$$

samples with its first half equivalent to its second half. Further, assume that any sub-part of the preamble with $\gamma$ samples, along with its equivalent copy, e.g., $S[1,\gamma]$ and $$S\left[\frac{L}{2}+1, \frac{L}{2}+\gamma\right],$$

ensures detection at the specified sensing threshold energy, e.g., −82 dBm, 10% false negative rate and, $10^{-5}$ false positive rate. FIG. 6 depicts the first half of the preambles transmitted and correlated by the various Wi-Fi devices (the second half is equivalent).

Preamble Transmission: A Wi-Fi device with transmit power level $P_k$ transmits $S_{P_k}^{Xmit,LH}$ comprising the first $$\gamma\left(\frac{P_N}{P_k}\right)$$

of the preamble and its copy in the second half of the preamble, e.g.:

$$S_{P_k}^{Xmit,LH} = S\left[1, \gamma\left(\frac{P_N}{P_k}\right)\right] \quad \text{Equation (11)}$$

This process ensures that Wi-Fi devices of all power levels transmit the equivalent amount of preamble energy given by $2\gamma P_N$.

Preamble Reception: A Wi-Fi device with a transmit power level of $P_k$ correlates against k different pieces of the preamble in the left half captured in $S_{P_k}^{Recv,LH}$ and its shifted copy in the second half, e.g.:

$$S_{P_k}^{Recv,LH} = S[1, \gamma] \cup \bigcup_{i=1}^{i=k-1} S\left[\gamma\left(\frac{P_N}{P_{k-i+1}}\right), \gamma\left(\frac{P_N}{P_{k-i+1}}\right) + \lambda_{k,i}\right] \quad \text{Equation (12)}$$

$$\lambda_{k,i} = P_k \gamma\left(\frac{1}{P_{k-i}} - \frac{1}{P_{k-i+1}}\right) \quad \text{Equation (13)}$$

The first piece is $S[1,\gamma]$. The rest of the k−1 pieces, have lengths of $\lambda_{k,i}, i=1, \ldots, k-1$ starting at sample number $$\gamma\left(\frac{P_N}{P_{k-i+1}}\right).$$

2.5.5 Skip-Correlation Considerations:

When a Wi-Fi device transmits at a power level $P_i$ to a device with transmit power level $P_k$, the following properties P1 and P2 are true:

P1: if $P_i \geq P_k$ the correlation is only against $S[1,\gamma]$.
P2: if $P_i < P_k$ the number of preamble samples correlated at the receiving device (in $S_{P_i}^{Xmit} \cap S_{P_k}^{Recv}$) is $$\gamma\left(\frac{P_k}{P_i}\right).$$

For example, consider two Wi-Fi devices, A and B, with power levels of $P_A > P_B$. When A transmits, the received power at B is $P'_A$. When B transmits, the received power at A is $$P'_B = P'_A\left(\frac{P_B}{P_A}\right).$$

In accordance with property P1, the number of samples received at B is $\gamma$ and the thus the preamble energy received by B is $2\gamma P'_A$. In accordance with property P2, the number of samples received at A is $$\gamma\left(\frac{P_A}{P_B}\right).$$

Therefore, the preamble energy received is $$2\gamma\left(\frac{P_A}{P_B}\right) \times P'_A\left(\frac{P_B}{P_A}\right) = 2\gamma P'_A.$$

Thus, both ends see the equivalent amount of preamble energy given by $2\gamma \max(P'_A, P'_B)$, thereby ensuring carrier sensing symmetry.

Property P1 is correct because the second piece of $S_{P_k}^{Recv}$ starts at $$\gamma\left(\frac{P_N}{P_k}\right),$$

and $S_{P_i}^{Xmit}$ ends at sample number $$\gamma\left(\frac{P_N}{P_i}\right).$$

When $P_i \geq P_k$, $$\frac{P_N}{P_k} \geq \frac{P_N}{P_i},$$

then $S_{P_i}^{Xmit} \cap S_{P_k}^{Recv}$ comprises only the first piece of $S_{P_k}^{Recv}$, i.e., $S[1, \gamma]$.

Property P2 is correct because any preamble piece is always completely contained between the ends of $S_{P_j}^{Xmit}$ and $S_{P_{j+1}}^{Xmit}$. Thus, when i<k there are k−i preamble pieces starting at the end of $S_{P_i}^{Xmit}$ until the end of $S_{P_k}^{Xmit}$. Therefore, total number of samples N (i, k) in $S_{P_i}^{Xmit} \cap S_{P_k}^{Recv}$ is given by:

$$N(i,k) = \gamma + \sum_{j=1}^{j=k-i} \lambda_{k,i} = \gamma + \gamma P_k\left(\frac{1}{P_i} - \frac{1}{P_k}\right) = \gamma\left(\frac{P_k}{P_i}\right) \quad \text{Equation (14)}$$

2.6 Example Designs and Implementations:

The following discussion describes various implementations of the Skip-Correlator based on the use of modified Schmidl-Cox based detection for purposes of explanation. However, as discussed herein, matched filter or other detection techniques may be adapted for use in skip-correlation based carrier sensing symmetry, and there is no requirement for the use of Schmidl-Cox based detection techniques for any implementations of the Skip-Correlator.

Typically, Schmidl-Cox detection is implemented on an ASIC in the Wi-Fi device as a digital circuit. However, any combination of digital or analog circuitry and software defined radios (e.g., WARP) may be adapted to implement Schmidl-Cox detection. Regardless of whether physical or software-defined circuitry is adapted to implement Schmidl-Cox detection, the skip-correlation based techniques described herein can be implemented by modifying conventional Schmidl-Cox based processes to operate with skip-correlation. The following paragraphs describe typical Schimdl-Cox correlation techniques followed by an explanation of various techniques for modifying such techniques to implement the various skip-correlation processes discussed herein.

Figure 7:
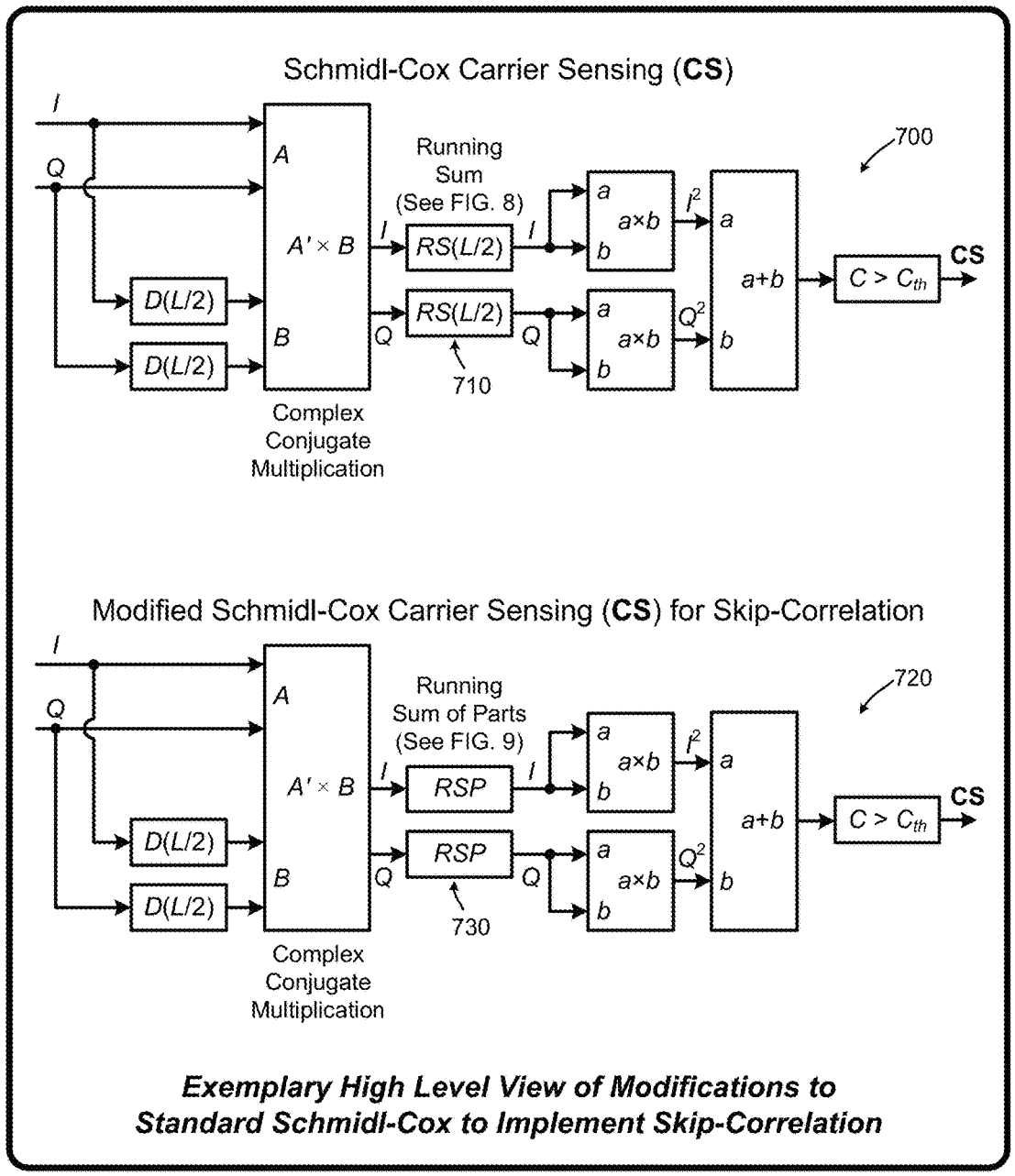
FIG. 7 illustrates an exemplary high level view of modifications to a standard Schmidl-Cox carrier sensing circuit for implementation of skip-correlation.

2.6.1 Exemplary Skip-Correlation Circuit Design:

A block-diagram of a typical Schmidl-Cox detector (700) is provided in FIG. 7 along with a modified skip-correlation based Schmidl-Cox detector (720). As illustrated, in the typical Schmidl-Cox detector (700), the received signal is a sequence of complex samples with I (real) and Q (imaginary) parts. D(x) blocks are delay elements that introduce a delay of x samples and are usually implemented using FIFO of depth x elements. The complex conjugate multiply block takes two complex samples s(i) and $$s\left(i + \frac{L}{2}\right)$$

(A and B, as illustrated) to perform the operation $$s(i)'s\left(i + \frac{L}{2}\right),$$

where ' denotes the complex conjugate operation. The real and imaginary parts from the complex conjugate multiplier are each fed into a running sum block (710), described in further detail below, that maintains the sum of the last $$\frac{L}{2}$$

samples. Finally, the real and imaginary parts of the running sum are squared and added to be compared against the threshold $C_{th}$ to perform carrier sensing (CS).

In contrast, as illustrated by FIG. 7, the running sum block of the typical Schmidl-Cox detector (700) is replaced by a running sum of parts block 730 to implement a Schmidl-Cox detection circuit (720) based on skip-correlation.

Exemplary Circuit for Running Sum used in Schmidl-Cox: The running sum over the past x samples in Schmidl-Cox is typically implemented by an equation such as Equation (15), where:

$$\text{sum}(i+1) = [s(i+1) - s(i-x)] + \text{sum}(i) \quad \text{Equation (15)}$$

Figure 8:
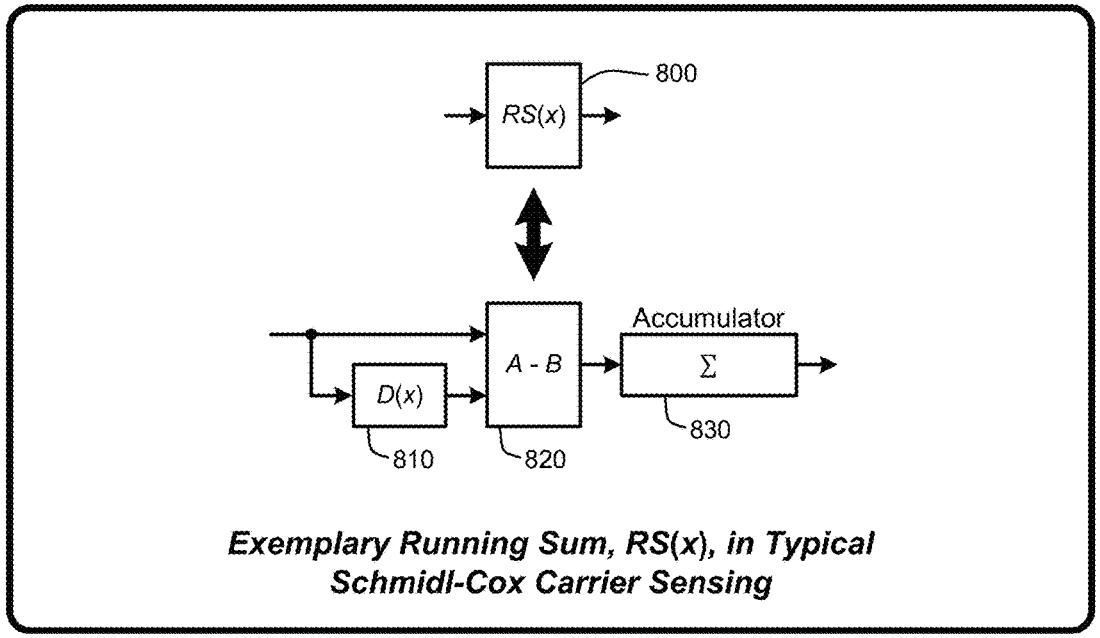
FIG. 8 illustrates an exemplary running sum circuit implementation, RS(x), in typical Schmidl-Cox carrier sensing.

FIG. 8 illustrates an exemplary circuit implementation (810, 820, 830) for a running sum RS(x) (800, also see element 710 of FIG. 7) as used in typical Schmidl-Cox carrier sensing. The A-B block (820) subtracts B from A, and this case produces s(i+1)−s(i−x) and the Σ bock (830) is an accumulator that continuously adds its inputs.

Figure 9:
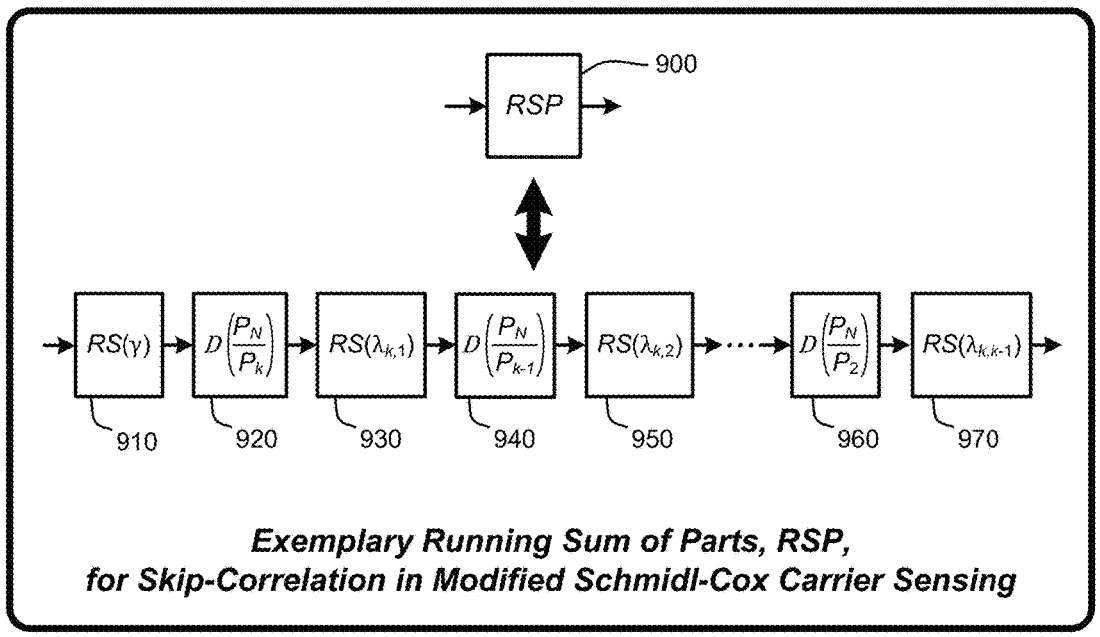
FIG. 9 illustrates an exemplary running sum of parts (RSP) circuit implementation for skip-correlation in a modified Schmidl-Cox carrier sensing circuit.

Exemplary Circuit for Running Sum of Parts in Skip-Correlator: In various implementations, an exemplary running sum of parts circuit for use in implementing skip-correlation based carrier sensing generally operates to compute the sum of several running sums, one for each piece of the preamble. FIG. 9 illustrates an exemplary circuit implementation (910 through 970) to enable a running sum of parts, RSP (900, also see element 730 of FIG. 7), for skip-correlation in a modified Schmidl-Cox carrier sensing circuit. Using the same notation as described in Section 2.5, for a device with power level $P_k$ the running sum of parts can be described as a cascade of k running sum blocks and delay elements. One exception is $P_N$ which correlates the entire preamble and is simply $$RS\left(\frac{L}{2}\right).$$

2.6.2 Exemplary Implementation using a Software Defined Radio:

A software defined radio platform, such as WARP, for example, may be adapted to implement any of the skip-correlation based techniques described herein for ensuring carrier sensing symmetry, including, but not limited to the modified Schmidl-Cox techniques described in the preceding paragraphs. The following paragraphs describe a WARP-based implementation. Such implementations may be instantiated using any desired range or set of transmit power levels to enable multiple Wi-Fi devices to fairly share available spectrum. The following examples of skip-correlation based preambles and preamble detection and processing for different transmit power levels were instantiated in a WARP-based implementation of a tested instantiation of the Skip-Correlator. However, the following examples and discussion apply to both hardware-based implementations of the Skip-Correlator and software-based radio implementations of the Skip-Correlator, as well as to any combination of hardware and software-based implementations of the Skip-Correlator.

Figure 10:
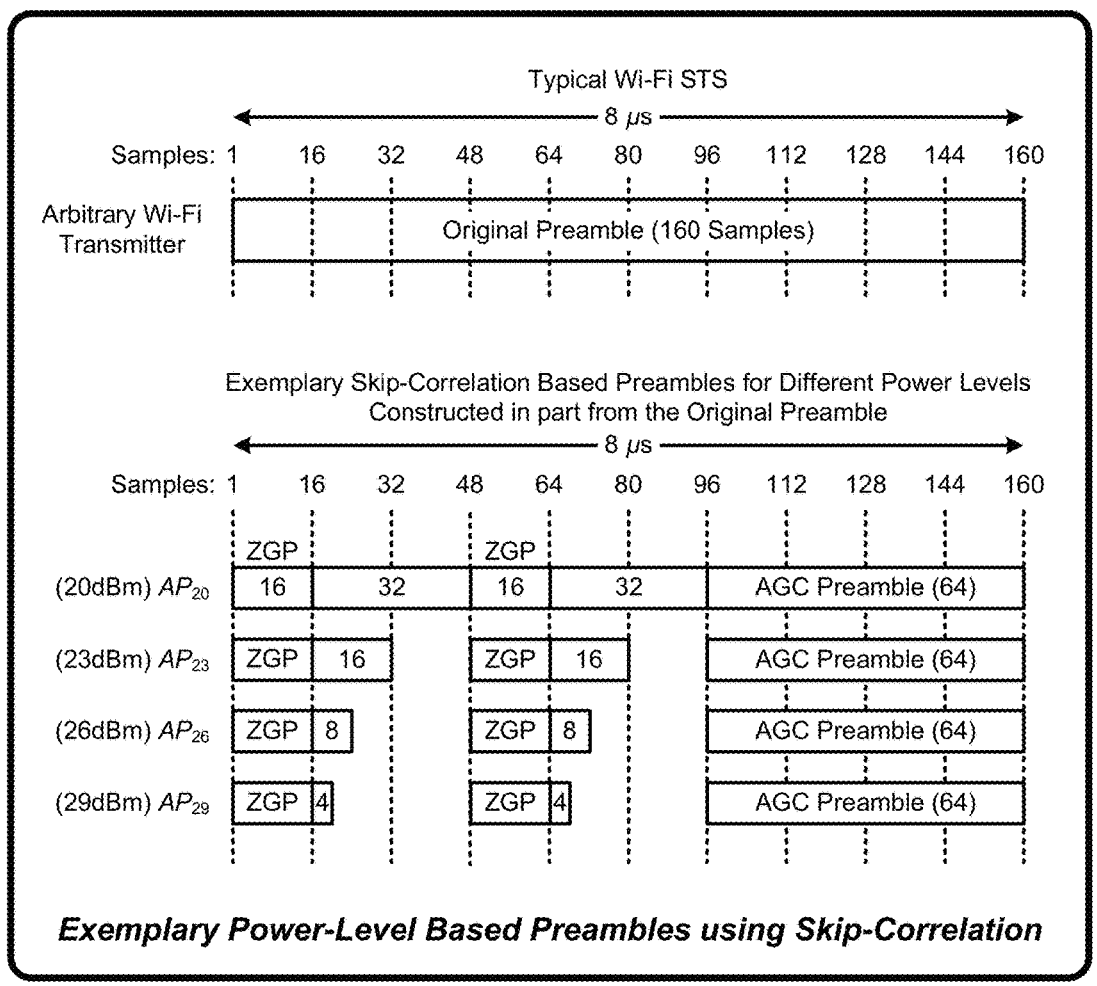
FIG. 10 illustrates exemplary power-level based preambles using skip-correlation based on the example of FIG. 5.

For example, consider the set of four Wi-Fi devices, previously described with respect to FIG. 5, operating at four different power levels, including 20 dBm, 23 dBm, 26 dBm and 29 dBm. An original Wi-Fi STS preamble (e.g., 160 samples long with a duration of 8 μs) for arbitrary Wi-Fi devices is illustrated in FIG. 10 along with exemplary skip-correlation based preambles generated for each of the set of four Wi-Fi devices operating at the above-described power levels. These skip-correlation based preambles are constructed, in part, from samples of the original preamble. In various implementations, the preambles generated by the Skip-Correlator reuse the Wi-Fi STS as much as possible for compatibility purposes with respect to functions such as automatic gain control, DC offset correction, and carrier sensing. However, there is no requirement for the Skip-Correlator reuse the Wi-Fi STS when generating preambles based on device transmit power level.

Automatic Gain Control (AGC): Since the range of Wi-Fi signals tends to be large (e.g., 70-80 dB) compared to the range supported by typical Analogue to Digital Converters (ADC) (e.g., 48-60 dB), there is a possibility that a strong signal may saturate the receiver. Therefore, WARP and most commercial radios have an AGC that adjusts the gain of the received signal to scale it appropriately before it is fed to the ADC. The AGC typically takes a few microseconds (typically less than 4 µs) to settle. However, in various implementations, when implementing skip-correlation based preambles, the entire original STS is not used for AGC because the skip-correlation process transmits only certain pieces of the original preamble based on the transmitter power level. Consequently, in various implementations, based on the typical AGC settling time, the Skip-Correlator replaces approximately the last 4 µs of the original preamble STS with a 64 sample "AGC preamble" for transmitters of any power level, as illustrated in FIG. 10.

DC Offset Correction and AGC Preamble Design: Concurrently, as the AGC settles down, the Wi-Fi receiver also tries to eliminate any DC offset (DCO) that may be present in the received signal. The DCO on a software radio such as WARP requires that the mean of the transmitted samples is zero over a length of 32 samples. Thus, the 64 sample AGC preamble comprises two non-equivalent parts of having a length of 32 each that have an average value of zero. Note that these halves are not made equivalent since this would falsely trigger Schmidl-Cox detection. In one implementation, each of these halves (having an average value of zero) is generated by taking the FFT of 32 samples of STS, then rotating each FFT coefficient by a random angle between 0-360 degrees and finally taking an IFFT. However, any desired technique for ensuring a difference between these halves to avoid falsely triggering Schmidl-Cox detections may be adapted for use by the Skip-Correlator.

Zero Gap Prefixes (ZGP): Due to multipath effects, reverberations from the last few samples of the AGC preamble tend to spill over into the first few samples of STS preamble in skip-correlation and thus make it different from the second half. The current IEEE 802.11 Wi-Fi standard suggests the use of a cyclic prefix to address this issue. However, the Skip-Correlator uses a different approach because the use of a cyclic prefix (or any non-zero values) will increase the preamble energy. Therefore, the Skip-Correlator transmits zeros by adding one or more a zero gap prefixes (ZGP) to the preamble. The current IEEE 802.11 Wi-Fi standard suggests the use of a cyclic prefix having a duration of 800 ns (i.e., 16 samples). To ensure as much commonality with the current IEEE 802.11 Wi-Fi standard as possible, in various implementations, the Skip-Correlator appends a 16 sample ZGP as a prefix to each of the pieces of the preamble that are transmitted by a particular Wi-Fi device, as illustrated by FIG. 10. To account for the addition of these additional 16 samples, of the ZGP, the delay element, $$D\left(\frac{L}{2}\right),$$

in the modified Schmidl-Cox circuit illustrated in FIG. 9 is changed to $$D\left(\frac{L}{2}+16\right).$$

For example, returning to FIG. 10, the preamble for the $AP_{20}$ Wi-Fi device (transmitting at 20 dBm) is constructed using a 16 sample ZGP, followed by 32 samples (e.g., samples 17-48) of the original preamble, followed by another 16 sample ZGP, followed by another 32 samples of the original preamble (e.g., samples 65-96), followed by a 64 sample AGC preamble for a total preamble length of 160 samples. Similarly, the preamble for the $AP_{23}$ Wi-Fi device (transmitting at a higher power of 23 dBm) is constructed using a 16 sample ZGP, followed by 16 samples (e.g., samples 17-32) of the original preamble, followed by another 16 sample ZGP, followed by another 16 samples of the original preamble (e.g., samples 65-80), followed by a 64 sample AGC preamble, for a total preamble length of 128 samples. Similarly, the preamble for the $AP_{26}$ Wi-Fi device (transmitting at a higher power of 26 dBm) is constructed using a 16 sample ZGP, followed by 8 samples (e.g., samples 17-24) of the original preamble, followed by another 16 sample ZGP, followed by another 8 samples of the original preamble (e.g., samples 65-72), followed by a 64 sample AGC preamble for a total preamble length of 112 samples. Similarly, the preamble for the $AP_{29}$ Wi-Fi device (transmitting at a higher power of 29 dBm) is constructed using a 16 sample ZGP, followed by 4 samples (e.g., samples 17-20) of the original preamble, followed by another 16 sample ZGP, followed by another 4 samples of the original preamble (e.g., samples 65-68), followed by a 64 sample AGC preamble for a total preamble length of 104 samples.

As such, in view of the preceding examples, it can be seen that in various implementations, the Skip-Correlator varies the length of the preamble transmitted by any Wi-Fi device based on the transmission power of that device. Any Wi-Fi receiver that receives any of these variable length preambles, then selects and correlates a subset of the samples of the received preamble as a function of its own transmit power levels, as described herein.

Normalized Auto-Correlation: A software defined radio such as WARP uses normalized autocorrelation instead of absolute autocorrelation, as described in the preceding paragraphs. This is necessitated because the AGC's scaling factor is unknown in the digital circuit. Computing normalized auto-correlation over the entire received preamble is not used in skip-correlation, as it will nullify all the gains obtained by accumulating more samples. Therefore, in various implementations, the Skip-Correlator normalizes against only the shortest length $\gamma=4$ worth of samples. This ensures that the received preamble energy scales with the number of blocks of length $\gamma$ that are correlated.

2.6.3 Exemplary Preambles without using AGC Portion of Preamble:

In various implementations, Skip-Correlator maintains compatibility with existing low power (20 dBm) nodes (e.g., as existing low end Wi-Fi routers, laptops, phones, etc.) by keeping the original STS preamble of such nodes unchanged, and only constructing new preambles for higher power nodes. For example, in various implementations, the original preamble for 20 dBm nodes is unchanged, while the preambles for higher power nodes is constructed without the use of the 64 sample AGC preamble described in Section 2.6.2 of this document with respect to FIG. 10. For example, in various implementations, the Skip-Correlator creates Wi-Fi like STS preambles with gaps for higher power nodes.

More specifically, in such implementations, the AGC portion of the overall preamble for higher power nodes (e.g., nodes transmitting above 20 dBm) is replaced by the corresponding samples of the original Wi-Fi preamble samples (e.g., samples 97-160). The preambles of the higher power nodes will be constructed similarly to the preambles described above, including the use of a ZGP prior to samples of the original preamble and gaps following those samples. One advantage of such implementations is that a preamble of a 20 dBm node, for example, will be identical to the standard IEEE 802.11 Wi-Fi preamble, while only higher power nodes will transmit different preambles. This is particularly useful for deployment with support for backward compatibility since low power (e.g., 20 dbm) nodes don't have to change and only new higher power Wi-Fi routers need to implement the various solutions provided by the Skip-Correlator.

Figure 11:
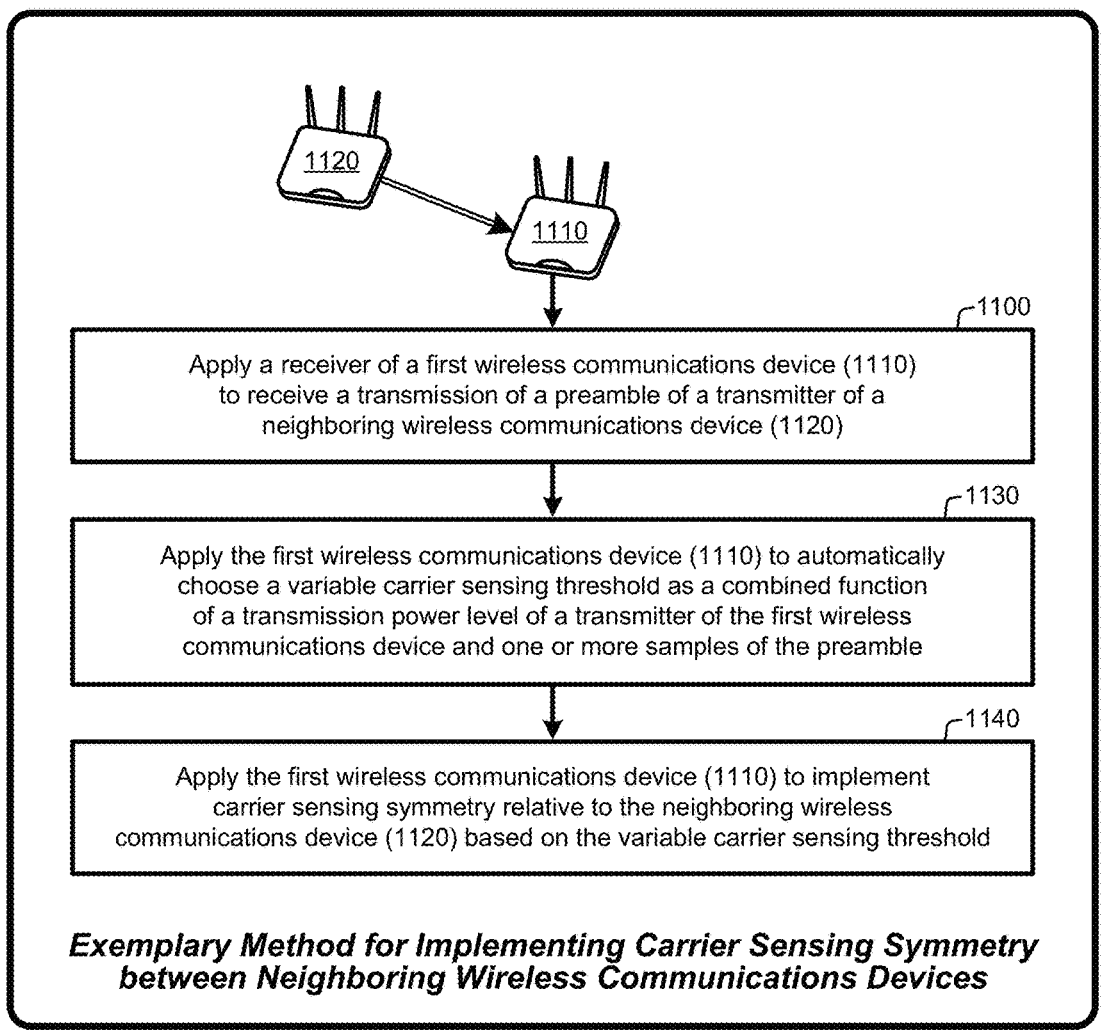
FIG. 11 illustrates an exemplary method for implementing the Skip-Correlator.
Figure 12:
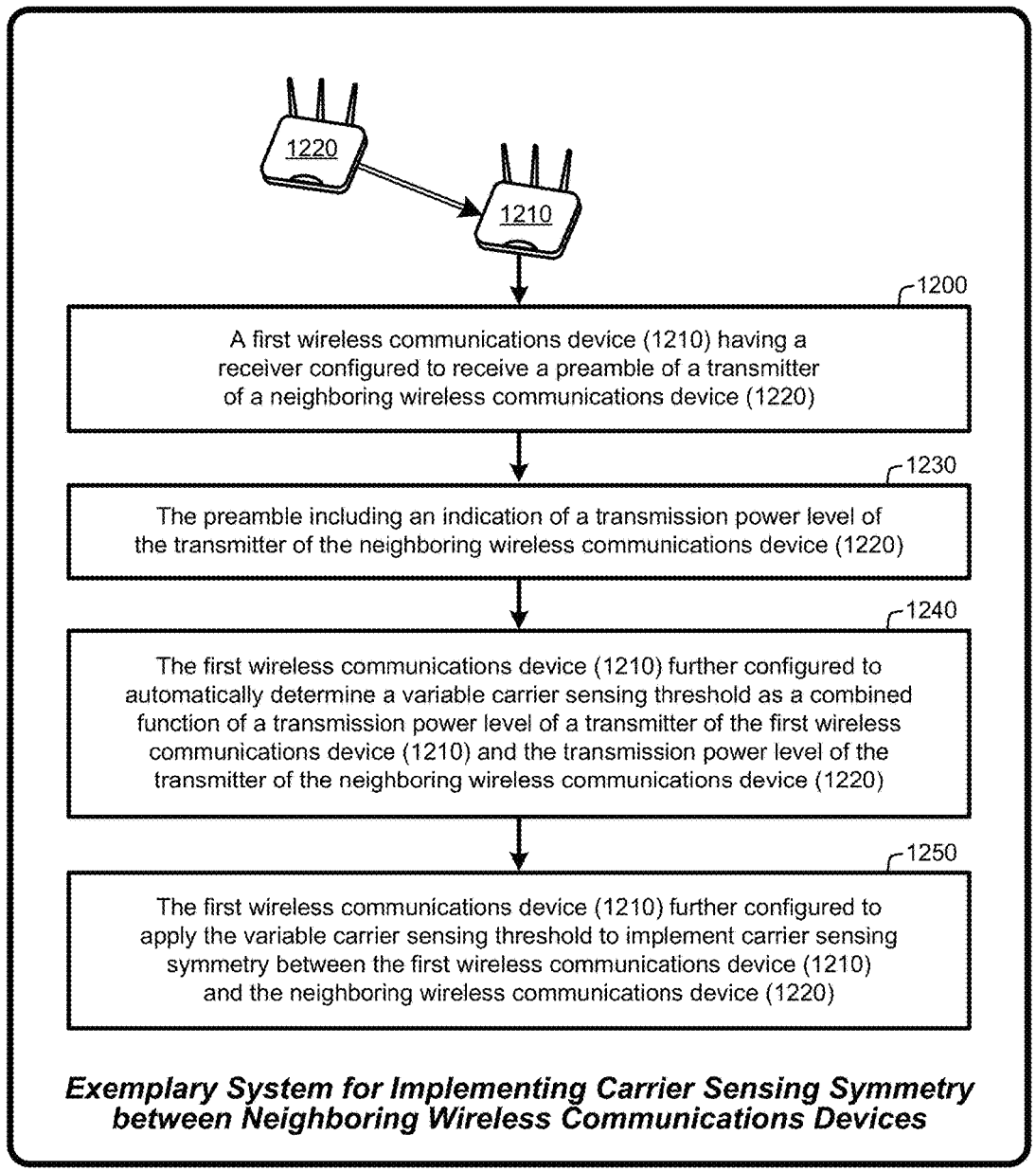
FIG. 12 illustrates an exemplary system for implementing the Skip-Correlator.
Figure 13:
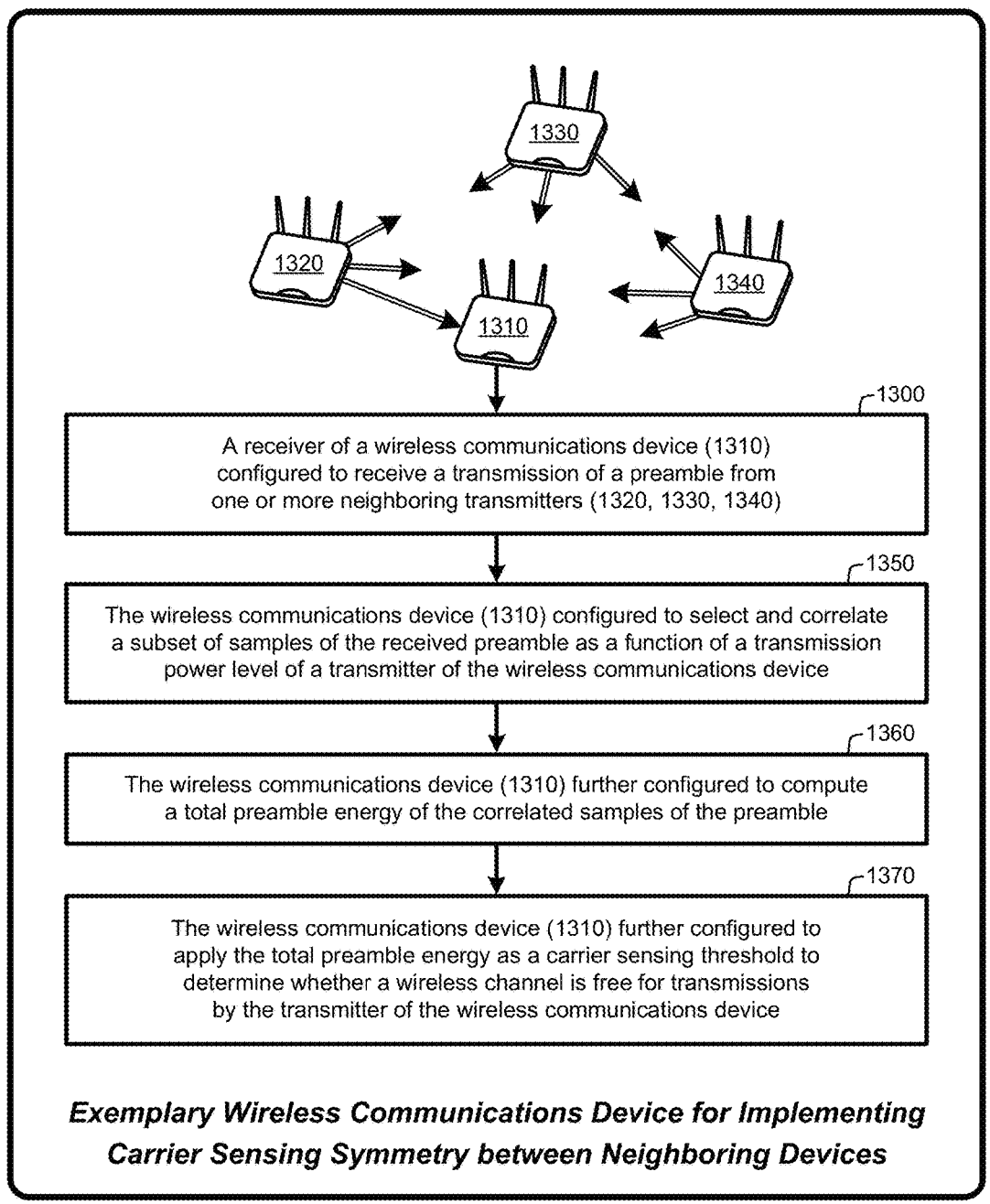
FIG. 13 illustrates an exemplary wireless communications device for implementing the Skip-Correlator.

3.0 Operational Summary of the Skip-Correlator:

The processes described above with respect to FIG. 1 through FIG. 10, and in further view of the detailed description provided above in Sections 1 and 2, are illustrated by the general operational flow diagrams of FIG. 11 through FIG. 13. In particular, FIG. 11 through FIG. 13 provide exemplary operational flow diagrams that summarizes the operation of some of the various implementations of the Skip-Correlator. FIG. 11 through FIG. 13 are not intended to provide an exhaustive representation of all of the various implementations of the Skip-Correlator described herein, and the implementations represented in these figures are provided only for purposes of explanation.

Further, any boxes and interconnections between boxes that may be represented by broken or dashed lines in FIG. 11 through FIG. 13 represent optional or alternate implementations of the Skip-Correlator described herein, and that any or all of these optional or alternate implementations, as described below, may be used in combination with other alternate implementations that are described throughout this document.

In general, as illustrated by FIG. 11, in various implementations, the Skip-Correlator begins operation by applying 1100 a receiver of a first wireless communications device (1110) to receive a transmission of a preamble of a transmitter of a neighboring wireless communications device (1120). The first wireless communications device (1110) is then applied 1130 to automatically choose a variable carrier sensing threshold as a combined function of a transmission power level of the transmitter of the first wireless communications device and one or more samples of the preamble. Finally, in various implementations, the first wireless communications device (1110) is applied to implement carrier sensing symmetry relative to the neighboring wireless communications device (1120) based on the variable carrier sensing threshold.

In general, as illustrated by FIG. 12, in various implementations, the Skip-Correlator begins operation by using a receiver of a first wireless communications device (1210) to receive a preamble of a transmitter of a neighboring wireless communications device (1220). As described herein, in various implementations, this Wi-Fi preamble includes an indication of a transmission power level of the transmitter of the neighboring wireless communications device (1220). Further, the first wireless communications device (1210) is configured to automatically determine a variable carrier sensing threshold as a combined function of a transmission power level of a transmitter of the first wireless communications device and the transmission power level of the transmitter of the neighboring wireless communications device (1220). Finally, in various implementations, the first wireless communications device (1210) is configured to apply the variable carrier sensing threshold to implement carrier sensing symmetry between the first wireless communications device and the neighboring wireless communications device (1220).

In general, as illustrated by FIG. 13, in various implementations, the Skip-Correlator include a receiver of a wireless communications device (1310) is configured to receive a transmission of a preamble from one or more neighboring transmitters (1320, 1330, 1340). In various implementations, the wireless communications device (1310) is configured to select and correlate a subset of samples of the received preamble as a function of a transmission power level of a transmitter of the wireless communications device. In addition, in various implementations, the wireless communications device (1310) is configured to compute a total preamble energy of the correlated samples of the preamble. Finally, in various implementations, the wireless communications device (1310) is configured to apply the total preamble energy as a carrier sensing threshold to determine whether a wireless channel is free for transmissions by the transmitter of the wireless communications device.

4.0 Exemplary Implementations of the Skip-Correlator:

The following paragraphs summarize various examples of implementations that may be claimed in the present document. The implementations summarized below are not intended to limit the subject matter that may be claimed in view of the detailed description of the Skip-Correlator. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, the Skip-Correlator ensures carrier sensing symmetry between wireless devices of arbitrary transmission power levels, thereby enabling fair sharing of available spectrum of a wireless channel between the wireless devices. In various implementations, receivers of a wireless device receive wireless preambles from neighboring wireless transmitters. This preamble includes an indication of a transmission power level of the neighboring wireless transmitter. The wireless device then selects and correlates a subset of samples of the received preamble as a function of a transmission power level of that wireless device. The remaining samples of the preamble are skipped by the receiving wireless device. Further, the wireless device computes a total preamble energy of the correlated samples of the received preamble. Finally, the wireless device implements carrier sensing symmetry between itself and the neighboring wireless transmitter as a function of the total preamble energy.

As a first example, in various implementations, a method is implemented via means, processes or techniques for implementing carrier sensing symmetry by first applying a receiver of a first wireless communications device to receive a transmission of a preamble of a transmitter of a neighboring wireless communications device. In various implementations, this method then applies the first wireless communications device to automatically choose a variable carrier sensing threshold as a combined function of a transmission power level of a transmitter of the first wireless communications device and one or more samples of the preamble. Finally, in various implementations, this method then applies the first wireless communications device to implement carrier sensing symmetry relative to the neighboring wireless communications device based on the variable carrier sensing threshold.

As a second example, in various implementations, the first example is further modified via means, processes or techniques wherein the preamble further comprises an indication of a transmission power level that is encoded into the preamble by the neighboring wireless communications device as a function of the transmit power of the transmitter of the neighboring wireless communications device.

As a third example, in various implementations, the second example is further modified via means, processes or techniques further comprising choosing the variable carrier sensing threshold as a combined function of the transmit power of the first wireless communications device and the transmit power of the neighboring wireless communications device.

As a fourth example, in various implementations, the second example is further modified via means, processes or techniques wherein the indication of the transmission power level is encoded into the Wi-Fi preamble by the neighboring wireless communications device by constructing a variable length preamble from a subset of samples of a corresponding Short Training Sequence (STS) as a function of the transmit power of the neighboring wireless communications device.

As a fifth example, in various implementations, the fourth example is further modified via means, processes or techniques wherein choosing the variable carrier sensing threshold further comprises applying the first wireless communications device to automatically select and correlate a subset of samples of the preamble as a function of the transmission power level of the first wireless communications device, computing a total preamble energy of the correlated samples of the preamble, and selecting the variable carrier sensing threshold as a function of the total preamble energy.

As a sixth example, in various implementations, any of the first example, the second example, the third example, the fourth example and the fifth example are further modified via means, processes or techniques wherein further comprising applying the first wireless communications device to maintain a table comprising a plurality of identified neighboring wireless transmitters and a transmit power of each of those neighboring wireless transmitters, wherein the preamble further comprises an identification of the neighboring wireless transmitter from which the transmission of the preamble was received, applying the first wireless communications device to perform a lookup on the table to determine the transmit power of the neighboring wireless transmitter identified by the preamble, and choosing the variable carrier sensing threshold as a combined function of the transmit power of the first wireless communications device and the transmit power of the identified neighboring wireless transmitter.

As a seventh example, in various implementations, any of the first example, the second example, the third example, the fourth example, the fifth example and the sixth example are further modified via means, processes or techniques wherein the preamble received from the transmitter of the neighboring wireless communications device is selected by the neighboring wireless communications device from a set of predefined preambles as a function of a transmit power of the neighboring wireless communications device, and wherein the first wireless communications device applies a matched filter bank to correlate the received preamble against each possible preamble from the set of preambles to choose the variable carrier sensing threshold.

As an eighth example, in various implementations, any of the first example, the second example, the third example, the fourth example, the fifth example, the sixth example, and the seventh example are further modified via means, processes or techniques wherein implementing carrier sensing symmetry further comprises applying the variable carrier sensing threshold to determine whether a particular wireless channel is free for transmissions by the first wireless communications device.

As a ninth example, in various implementations, any of the first example, the second example, the third example, the fourth example, the fifth example, the sixth example, the seventh example, and the eighth example are further modified via means, processes or techniques wherein the receiver is a component of a physical radio of the first wireless communications device.

As a tenth example, in various implementations, any of the first example, the second example, the third example, the fourth example, the fifth example, the sixth example, the seventh example, the eighth example and the ninth example are further modified via means, processes or techniques wherein the receiver is a component of a software-defined radio of the first wireless communications device.

As an eleventh example, in various implementations, a system for implementing carrier sensing symmetry is implemented via means, processes or techniques that include a first wireless communications device having a receiver configured to receive a preamble of a transmitter of a neighboring wireless communications device. In various implementations, the preamble includes an indication of a transmission power level of the transmitter of the neighboring wireless communications device. In addition, the first wireless communications device is further configured to automatically determine a variable carrier sensing threshold as a combined function of a transmission power level of a transmitter of the first wireless communications device and the transmission power level of the transmitter of the neighboring wireless communications device. Finally, in various implementations, the first wireless communications device is further configured to apply the variable carrier sensing threshold to implement carrier sensing symmetry between the first wireless communications device and the neighboring wireless communications device.

As a twelfth example, in various implementations, the eleventh example is further modified via means, processes or techniques wherein the preamble is constructed by the neighboring wireless communications device from a subset of samples of a corresponding Short Training Sequence (STS) as a function of the transmit power of the transmitter of the neighboring wireless communications device.

As a thirteenth example, in various implementations, the twelfth example is further modified via means, processes or techniques wherein determining the variable carrier sensing threshold further comprises applying the first wireless communications device to automatically select and correlate a subset of samples of the preamble as a function of the transmission power level of the transmitter of the first wireless communications device, computing a total preamble energy of the correlated samples, and determining the variable carrier sensing threshold as a function of the total preamble energy.

As a fourteenth example, in various implementations, any of the twelfth example and the thirteenth example are further modified via means, processes or techniques wherein implementing carrier sensing symmetry further comprises applying the variable carrier sensing threshold to determine whether a particular wireless channel is free for transmissions by the first wireless communications device.

As a fifteenth example, in various implementations, any of the twelfth example, the thirteenth example, and the fourteenth example are further modified via means, processes or techniques wherein the preamble received from the transmitter of the neighboring wireless communications device is selected by the neighboring wireless communications device from a set of predefined preambles as a function of the transmit power of the transmitter of the neighboring wireless communications device, wherein the first wireless communications device applies a matched filter bank to correlate the received preamble against each possible preamble from the set of preambles to determine the variable carrier sensing threshold.

As a sixteenth example, in various implementations, a wireless communications device is implemented via means, processes or techniques that include a receiver configured to receive a transmission of a preamble from one or more neighboring transmitters. In addition, in various implementations, this wireless communications device is configured to select and correlate a subset of samples of the received preamble as a function of a transmission power level of a transmitter of the wireless communications device. Further, in various implementations, the wireless communications device is also configured to compute a total preamble energy of the correlated samples of the preamble. Finally, in various implementations, the wireless communications device is configured to apply the total preamble energy as a carrier sensing threshold to determine whether a wireless channel is free for transmissions by the transmitter of the wireless communications device.

As a seventeenth example, in various implementations, the sixteenth example is further modified via means, processes or techniques wherein the preamble further comprises an indication of a transmission power level of the neighboring transmitter from which the preamble was received.

As an eighteenth example, in various implementations, the seventeenth example is further modified via means, processes or techniques further comprising applying the wireless communications device to automatically determine the variable carrier sensing threshold as a combined function of the transmit power of the transmitter of the wireless communications device and the transmit power of the neighboring transmitter from which the preamble was received.

As a nineteenth example, in various implementations, the seventeenth example is further modified via means, processes or techniques wherein the indication of the transmission power level is encoded into the preamble by the neighboring transmitter from which the preamble was received by constructing a variable length preamble from a subset of samples of a corresponding Short Training Sequence (STS) as a function of the transmit power of the neighboring transmitter.

As a twentieth example, in various implementations, any of the sixteenth example, the seventeenth example, the eighteenth example and the nineteenth example are further modified via means, processes or techniques wherein the receiver and the transmitter of the wireless communications device further comprise any combination of physical radio devices and software-defined radio devices.

Figure 14:
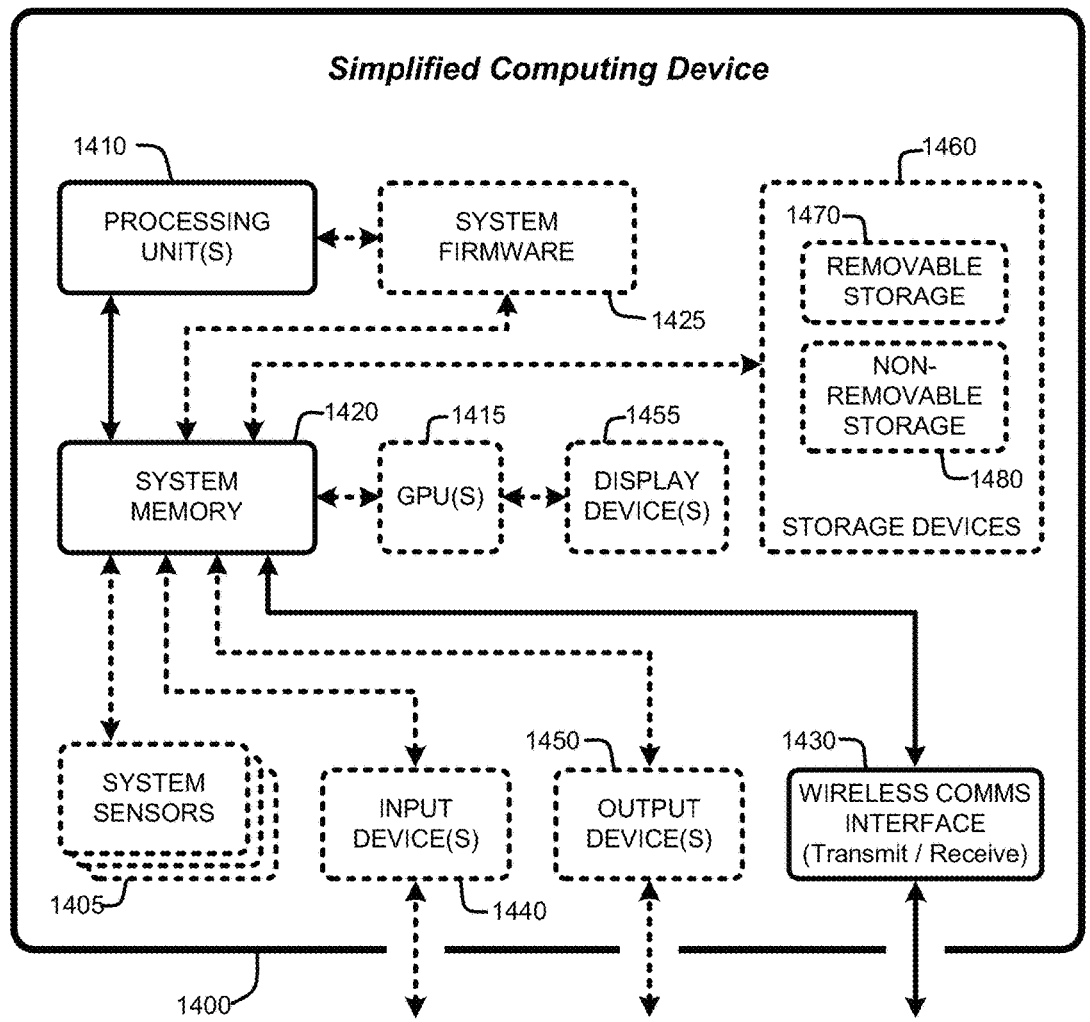
FIG. 14 is a general system diagram depicting a simplified general-purpose computing device having simplified computing and I/O capabilities for use in effecting various implementations of the Skip-Correlator, as described herein.

5.0 Exemplary Operating Environments:

The Skip-Correlator implementations described herein are operational within numerous types of general purpose or special purpose computing system environments or configurations. FIG. 14 illustrates a simplified example of a general-purpose computer system on which various implementations and elements of the Skip-Correlator, as described herein, may be implemented. Any boxes that are represented by broken or dashed lines in the simplified computing device 1400 shown in FIG. 14 represent alternate implementations of the simplified computing device. As described below, any or all of these alternate implementations may be used in combination with other alternate implementations that are described throughout this document.

The simplified computing device 1400 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Skip-Correlator implementations described herein, the device should have a sufficient computational capability and system memory to enable basic computational operations. In particular, the computational capability of the simplified computing device 1400 shown in FIG. 14 is generally illustrated by one or more processing unit(s) 1410, and may also include one or more graphics processing units (GPUs) 1415, either or both in communication with system memory 1420. The processing unit(s) 1410 of the simplified computing device 1400 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 1400 may also include other components, such as, for example, a Wireless Communication Interface 1430 including both a transmitter and a receiver. Wireless communication interfaces 1430 are known to those skilled in the art and will not be described herein. The simplified computing device 1400 may also include one or more conventional computer input devices 1440 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 1400 and with any other component or feature of the Skip-Correlator, including input, output, control, feedback, and response to one or more users or other devices or systems associated with the Skip-Correlator, are enabled by a variety of Natural User Interface (NUI) scenarios. The NUI techniques and scenarios enabled by the Skip-Correlator include, but are not limited to, interface technologies that allow one or more users user to interact with the Skip-Correlator in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 1440 or system sensors 1405. Such NUI implementations are also enabled by the use of various techniques including, but not limited to, information derived from system sensors 1405 or other input devices 1440 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Skip-Correlator.

However, the aforementioned exemplary NUI scenarios may be further augmented by combining the use of artificial constraints or additional signals with any combination of NUI inputs. Such artificial constraints or additional signals may be imposed or generated by input devices 1440 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Skip-Correlator.

The simplified computing device 1400 may also include other optional components such as one or more conventional computer output devices 1450 (e.g., display device(s) 1455, audio output devices, video output devices, devices for transmitting wired or wireless data transmissions, and the like). Typical input devices 1440, output devices 1450, and storage devices 1460 for general-purpose computers are well known to those skilled in the art, and will not be described in detail herein.

The simplified computing device 1400 shown in FIG. 14 may also include a variety of computer-readable media. Computer-readable media can be any available media that can be accessed by the computing device 1400 via storage devices 1460, and include both volatile and nonvolatile media that is either removable 1470 and/or non-removable 1480, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information or content delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Skip-Correlator implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 1425, hardware, or any combination thereof to control a computer to implement the disclosed subject matter. The term "article of manufacture" as used herein is intended to encompass a computer program accessible from any computer-readable device, or media.

The Skip-Correlator implementations described herein may be further described in the general context of computer-executable instructions, such as program modules, being executed by a computing device. Generally, program modules include routines, programs, objects, components, data structures, and the like, that perform particular tasks or implement particular abstract data types. The Skip-Correlator implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the Skip-Correlator has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the Skip-Correlator. It is intended that the scope of the Skip-Correlator be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Skip-Correlator described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A method, comprising:
   applying a receiver of a first wireless communications device to receive a transmission of a preamble of a transmitter of a neighboring wireless communications device;
   selecting and correlating a subset of one or more samples of the preamble as a function of a transmission power level of a transmitter of the first wireless communications device;
   applying the first wireless communications device to automatically choose a variable carrier sensing threshold as a combined function of the transmission power level of the transmitter of the first wireless communications device and the subset of the one or more samples of the preamble; and
   applying the first wireless communications device to implement carrier sensing symmetry relative to the neighboring wireless communications device based on the variable carrier sensing threshold.

2. The method of claim 1 wherein the preamble further comprises an indication of the transmission power level that is encoded into the preamble by the neighboring wireless communications device as a function of the transmit power of the transmitter of the neighboring wireless communications device.

3. The method of claim 2 further comprising choosing the variable carrier sensing threshold as a combined function of the transmit power of the first wireless communications device and the transmit power of the neighboring wireless communications device.

4. The method of claim 2 wherein the indication of the transmission power level is encoded into the preamble by the neighboring wireless communications device by constructing a variable length preamble from a subset of samples of a corresponding Short Training Sequence (STS) as a function of the transmit power of the neighboring wireless communications device.

5. The method of claim 4 wherein choosing the variable carrier sensing threshold further comprises:
   applying the first wireless communications device to automatically select and correlate the subset of samples of the preamble;
   computing a total preamble energy of the correlated samples of the preamble; and
   selecting the variable carrier sensing threshold as a function of the total preamble energy.

6. The method of claim 1 further comprising:
   applying the first wireless communications device to maintain a table comprising a plurality of identified neighboring wireless transmitters and a transmit power of each of those neighboring wireless transmitters;
   wherein the preamble further comprises an identification of the neighboring wireless transmitter from which the transmission of the preamble was received;
   applying the first wireless communications device to perform a lookup on the table to determine the transmit power of the neighboring wireless transmitter identified by the preamble; and
   choosing the variable carrier sensing threshold as a combined function of the transmit power of the first wireless communications device and the transmit power of the identified neighboring wireless transmitter.

7. The method of claim 1 wherein:
the preamble received from the transmitter of the neighboring wireless communications device is selected by the neighboring wireless communications device from a set of predefined preambles as a function of a transmit power of the neighboring wireless communications device; and
wherein the first wireless communications device applies a matched filter bank to correlate the received preamble against each possible preamble from the set of preambles to choose the variable carrier sensing threshold.

8. The method of claim 1 wherein implementing carrier sensing symmetry further comprises applying the variable carrier sensing threshold to determine whether a particular wireless channel is free for transmissions by the first wireless communications device.

9. The method of claim 1 wherein the receiver is a component of a physical radio of the first wireless communications device.

10. The method of claim 1 wherein the receiver is a component of a software-defined radio of the first wireless communications device.

11. A system, comprising:
a first wireless communications device having a receiver configured to receive a preamble of a transmitter of a neighboring wireless communications device and to select and correlate a subset of one or more samples of the preamble as a function of a transmission power level of a transmitter of the first wireless communications device;
the preamble including an indication of a transmission power level of the transmitter of the neighboring wireless communications device;
the first wireless communications device further configured to automatically determine a variable carrier sensing threshold as a combined function of the transmission power level of the transmitter of the first wireless communications device and the transmission power level of the transmitter of the neighboring wireless communications device; and
the first wireless communications device further configured to apply the variable carrier sensing threshold to implement carrier sensing symmetry between the first wireless communications device and the neighboring wireless communications device.

12. The system of claim 11 wherein the preamble is constructed by the neighboring wireless communications device from a subset of samples of a corresponding Short Training Sequence (STS) as a function of the transmit power of the transmitter of the neighboring wireless communications device.

13. The system of claim 12 wherein determining the variable carrier sensing threshold further comprises:
applying the first wireless communications device to automatically select and correlate the subset of samples of the preamble;
computing a total preamble energy of the correlated samples; and
determining the variable carrier sensing threshold as a function of the total preamble energy.

14. The system of claim 11 wherein implementing carrier sensing symmetry further comprises applying the variable carrier sensing threshold to determine whether a particular wireless channel is free for transmissions by the first wireless communications device.

15. The system of claim 11 wherein the preamble received from the transmitter of the neighboring wireless communications device is selected by the neighboring wireless communications device from a set of predefined preambles as a function of the transmit power of the transmitter of the neighboring wireless communications device; and
wherein the first wireless communications device applies a matched filter bank to correlate the received preamble against each possible preamble from the set of preambles to determine the variable carrier sensing threshold.

16. A wireless communications device comprising:
a receiver configured to receive a transmission of a preamble from one or more neighboring transmitters;
the wireless communications device configured to select and correlate a subset of samples of the received preamble as a function of a transmission power level of a transmitter of the wireless communications device;
the wireless communications device further configured to compute a total preamble energy of the correlated samples of the preamble; and
the wireless communications device further configured to apply the total preamble energy as a carrier sensing threshold to determine whether a wireless channel is free for transmissions by the transmitter of the wireless communications device.

17. The wireless communications device of claim 16 wherein the preamble further comprises an indication of a transmission power level of the neighboring transmitter from which the preamble was received.

18. The wireless communications device of claim 17 further comprising applying the wireless communications device to automatically determine the variable carrier sensing threshold as a combined function of the transmit power of the transmitter of the wireless communications device and the transmit power of the neighboring transmitter from which the preamble was received.

19. The wireless communications device of claim 17, wherein the indication of the transmission power level is encoded into the preamble by the neighboring transmitter from which the preamble was received by constructing a variable length preamble from a subset of samples of a corresponding Short Training Sequence (STS) as a function of the transmit power of the neighboring transmitter.

20. The wireless communications device of claim 16 wherein the receiver and the transmitter of the wireless communications device further comprise any combination of physical radio devices and software-defined radio devices.

* * * * *